United States Patent
Park et al.

(10) Patent No.: US 10,555,363 B2
(45) Date of Patent: Feb. 4, 2020

(54) NETWORK CONNECTION METHOD OF TERMINAL USING VIRTUAL UE SYSTEM

(71) Applicant: LG ELECTRONICS INC., Seoul (KR)

(72) Inventors: Kyungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 15/738,429

(22) PCT Filed: Jan. 20, 2016

(86) PCT No.: PCT/KR2016/000596
§ 371 (c)(1),
(2) Date: Dec. 20, 2017

(87) PCT Pub. No.: WO2016/208836
PCT Pub. Date: Dec. 29, 2016

(65) Prior Publication Data
US 2018/0184473 A1 Jun. 28, 2018

Related U.S. Application Data

(60) Provisional application No. 62/184,912, filed on Jun. 26, 2015.

(51) Int. Cl.
*H04W 76/25* (2018.01)
*H04W 76/15* (2018.01)
(Continued)

(52) U.S. Cl.
CPC ......... *H04W 76/25* (2018.02); *H04L 41/0866* (2013.01); *H04W 4/06* (2013.01);
(Continued)

(58) Field of Classification Search
CPC ....... H04W 76/15; H04W 4/06; H04W 48/16; H04W 72/0413; H04W 74/0833;
(Continued)

(56) References Cited

U.S. PATENT DOCUMENTS

| 2010/0216479 A1 | 8/2010 | Kato et al. |
| 2010/0234071 A1 | 9/2010 | Shabtay et al. |

(Continued)

FOREIGN PATENT DOCUMENTS

| GB | 2484922 A | 5/2012 |
| JP | 2013-546244 A | 12/2013 |

(Continued)

*Primary Examiner* — Ian N Moore
*Assistant Examiner* — Brian T Le
(74) *Attorney, Agent, or Firm* — Dentons US LLP

(57) ABSTRACT

Disclosed is a network connection method using a virtual UE system, comprising: establishing a connection with a base station with respect to a first DU group comprising one or more DUs; requesting a base station for an establishment of a connection with a second DU group comprising one or more Dus through an uplink channel assigned to the first DU group; and transmitting, to the base station through the uplink channel assigned to the second DU group, information informing that the connection with the second group has been established.

7 Claims, 24 Drawing Sheets

(51) Int. Cl.
   *H04W 74/08* (2009.01)
   *H04L 12/24* (2006.01)
   *H04W 72/04* (2009.01)
   *H04W 4/06* (2009.01)
   *H04W 48/16* (2009.01)
   *H04W 88/06* (2009.01)
   *H04W 88/08* (2009.01)
   *H04W 4/40* (2018.01)
   *H04W 84/00* (2009.01)

(52) U.S. Cl.
   CPC ....... *H04W 48/16* (2013.01); *H04W 72/0413* (2013.01); *H04W 74/0833* (2013.01); *H04W 76/15* (2018.02); *H04W 4/40* (2018.02); *H04W 84/005* (2013.01); *H04W 88/06* (2013.01); *H04W 88/08* (2013.01)

(58) Field of Classification Search
   CPC ..... H04W 4/40; H04W 84/005; H04W 88/06; H04W 88/08; H04L 41/0866
   See application file for complete search history.

(56) References Cited

U.S. PATENT DOCUMENTS

| | | |
|---|---|---|
| 2012/0184306 A1 | 7/2012 | Zou et al. |
| 2013/0163484 A1 | 6/2013 | Ihm et al. |
| 2013/0188534 A1 | 7/2013 | Baldemair et al. |
| 2013/0223356 A1 | 8/2013 | Khoshnevis |
| 2013/0331057 A1 | 12/2013 | Kodali et al. |
| 2013/0343256 A1* | 12/2013 | Zakrzewski ............ H04W 8/26 370/312 |
| 2014/0003329 A1 | 1/2014 | Chen |
| 2014/0003377 A1 | 1/2014 | Park et al. |
| 2014/0016534 A1 | 1/2014 | Kim et al. |
| 2014/0153534 A1 | 6/2014 | Kim et al. |
| 2015/0334748 A1 | 11/2015 | Yu |

FOREIGN PATENT DOCUMENTS

| | | |
|---|---|---|
| JP | 2015508943 A | 3/2015 |
| WO | 2014167073 A2 | 10/2014 |

* cited by examiner

| UE ID | corresponding DU (sub-array) | UE IDs |
|---|---|---|
| ID 0 (RNTI #1) | all DUs | default UE ID recognized by all entry of network |
| ID 1 (RNTI #2) | DU 1 | virtual UE ID |
| ID 2 (RNTI #3) | DU 2 | virtual UE ID |
| ID 3 (RNTI #4) | DU 3 & DU 4 | virtual UE ID |
| ID 4 (RNTI #5) | DU 1 & DU 2 | virtual UE ID |

| Combination index | Configured User/UE |
|---|---|
| 0 | ID 0 |
| 1 | ID 1 |
| 2 | ID 1, ID 2 |
| 3 | ID 3, ID 4 |

NETWORK CONNECTION METHOD OF TERMINAL USING VIRTUAL UE SYSTEM

This application is a National Stage Application of International Application No. PCT/KR2016/000596, filed on Jan. 20, 2016, which claims the benefit of U.S. Provisional Application No. 62/184,912, filed on Jun. 26, 2015, all of which are hereby incorporated by reference in their entirety for all purposes as if fully set forth herein.

TECHNICAL FIELD

The present invention relates to a method for accessing a network of a device by using a virtual UE (user equipment) scheme and a device thereto. Specifically, network access procedure of a device is disclosed in a system of distributed antenna system (DAS).

BACKGROUND ART

In a conventional mobile communication system, services for personal mobile communication device occupy most of data traffic. Since required data rate & quality of service (QoS) are inverse proportional to mobility of the mobile device, current communication system offers services with good quality for a mobile device with low mobility and offers services with stability without link failures for a mobile device with high mobility.

As frequency of use of wireless communication and criteria of usage of wireless communication increase, needs of providing high data rate & high QoS for a user with high mobility increase. For example, a plurality of users in a public transportation may want to watch multimedia contents while the transportation, or a plurality of passengers in personal vehicle which is driving in a highway may use different wireless communication services. In the above-mentioned cases, mobile communication system should be able to provide wireless services with good quality for the users with high mobility.

It is a new model which is not present in current wireless communication model. To support this, mobile communication network needs to be enhanced to a level of revolution or a new system to implement the new model without any influence to current network infrastructures should be configured.

There is a discussion about V2X (Vehicle to Infra/Vehicle/Nomadic) communication technic to support efficient communication for users in vehicles. V2X includes a communication between vehicle to infrastructure (V2I) and a communication between vehicle to vehicle (V2V).

When a large size of an antenna array is installed outside vehicle and is operated to provide high quality service to a high speed moving vehicle, aesthetic problems and aerodynamic problems can be raised. Thus, a study of an antenna array for vehicles is needed.

DISCLOSURE

Technical Problem

The present invention is devised to solve the aforementioned general technical problem. One object of the present invention is to provide high throughput in vehicle communication system.

Another object of the present invention is to enhance communication efficiency without deteriorating design value and/or aerodynamic performance of a vehicle.

The other object of the present invention is to adaptively controlling network connections of the distributed antennas while maintaining compatibility with a current communication system standards.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

The object of the present invention can be achieved by providing a method for accessing, by a terminal, a network using a virtual UE scheme, the method including establishing a connection with a base station for a first distributed unit (DU) group including one or more DUs, requesting, through an uplink channel allocated to the first DU group from the base station, that the base station establish a connection for a second DU group including one or more DUs, and transmitting, to the base station over an uplink channel allocated to the second DU group, information indicating that the connection for the second DU group has been established when the base station approves the connection for the second DU group.

The method may further include receiving a request for additional information on the second DU group from the base station in response to a request for the connection for the second DU group, and transmitting information about a channel measured between the second DU group and the base station to the base station.

The requesting may include requesting that a connection preconfigured between the first DU group and the base station be reconfigured.

The requesting of the reconfiguration may include transmitting information on at least one of whether or not CL-MIMO (Closed Loop MIMO) of the second DU group is supported, whether or not single port transmission/reception is performed, a maximum MCS level, or a maximum rank number.

The requesting of the reconfiguration may include transmitting an index value matching the information to the base station.

The requesting may include transmitting, to the base station, a preset index value for the one or more DUs included in the second DU group.

The first DU group and the second DU group may be separately recognized by the base station and may be recognized as one object by an upper network entry.

One bearer may be shared between the first DU group and the second DU group.

The one or more DUs included in the first DU group may be distributed over a vehicle and connected to a central unit (CU).

In another aspect of the present invention, provided herein is a terminal for accessing a network using a virtual UE scheme, the terminal including a transmitter, a receiver, and a processor connected to the transmitter and the receiver, wherein the processor is configured to establish a connection with a base station for a first distributed unit (DU) group including one or more DUs, to request, through an uplink channel allocated to the first DU group from the base station, that the base station establish a connection for a second DU group including one or more DUs, and to transmit, to the base station over the uplink channel allocated to the second DU group, information indicating that the connection for the second DU group has been established when the base station approves the connection for the second DU group.

Advantageous Effects

Accordingly, the present invention provides the following effects or advantages.

First, high-rank communication and multiple codeword communications may be implemented in a vehicle communication system, thereby increasing efficiency of the vehicle communication system.

Second, communication efficiency may be enhanced by utilizing the vehicle structure without affecting the design and aerodynamic performance of the vehicle.

Third, by arranging distributed antennas on the vehicle and dynamically configuring connections thereof, vehicle communication performance may be improved without affecting the current communication system.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

DESCRIPTION OF DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

FIGS. 13A, 13B, 13C and 14D show exemplary embodiments of message configurations when the virtual UE scheme is applied.

BEST MODE

Figure 1:
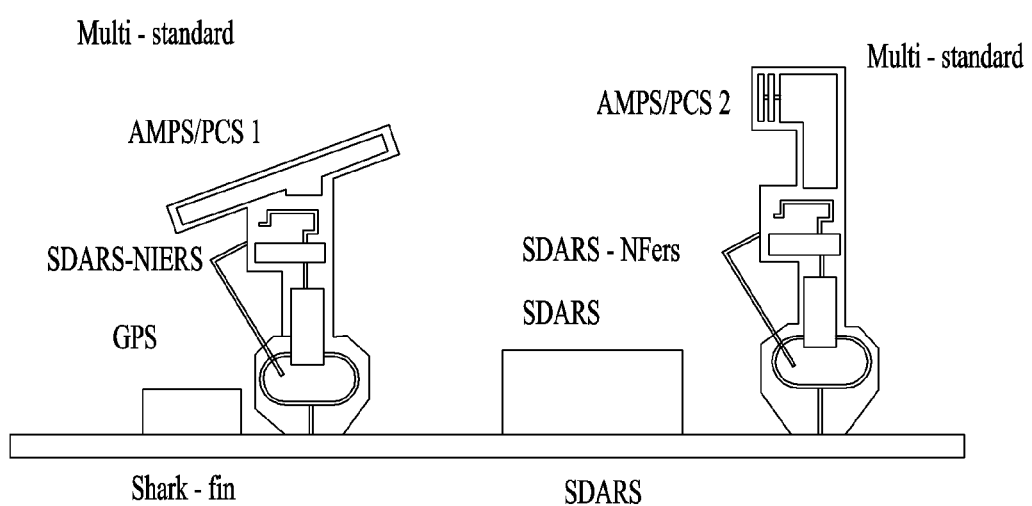
FIG. 1 illustrates a structure of a shark antenna.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceives a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

1. Distributed Antenna System (DAS)

Vehicular MIMO (Multi-Input Multi-Output) system which includes large-size antenna array installed in vehicle to provide good quality services in high-mobility moving situations through large array gain and relays received data from central unit (CU) of a vehicle to in-vehicle passengers is considered to provide efficient vehicle communication as mentioned above.

When a large-sized antenna array is installed outside the vehicle and the wireless communication between the eNB and the passengers in the vehicle is relayed via the antenna array, degradation of communication performance due to penetration loss having an average of about 20 dB may be prevented. Further, large array gain can be obtained by using more antennas than personal portable communication devices, and Rx diversity can also be easily obtained since the antennas exists with large distances.

By the above-mentioned features, communication services can be provided with relatively good quality without additional investments in infrastructures. Despite these advantages, the large antenna array has never installed outside vehicles. It is not easy to install the large antenna array outside vehicles since vehicles are expensive assets than personal communication devices, are not easy to enhance & upgrade, and require design concept, aerodynamic structure, etc. Accordingly, it is not easy to install a large-sized antenna array, which restricts vehicle design in terms of aesthetics/aerodynamics, in a vehicle.

To remove visual discomfort of antenna arrays, vehicle manufacturers use combinational antenna which has worse performance than single antenna. FIG. 1 illustrates a structure of a shark antenna.

As can be seen from FIG. 1, a shark antenna consists of 4 or more antennas supporting different bandwidth/services. But, the shark antenna is not enough to provide high quality communications, since the shark antenna has worse performance than single antenna, as said before.

Thus, embodiments of the present invention consider distributed antenna array system (DAS) which implements arrayed antenna system with a plurality of antennas, not a single antenna to solve the problem of shark antenna and the space constraints of large antenna array.

Figure 2:
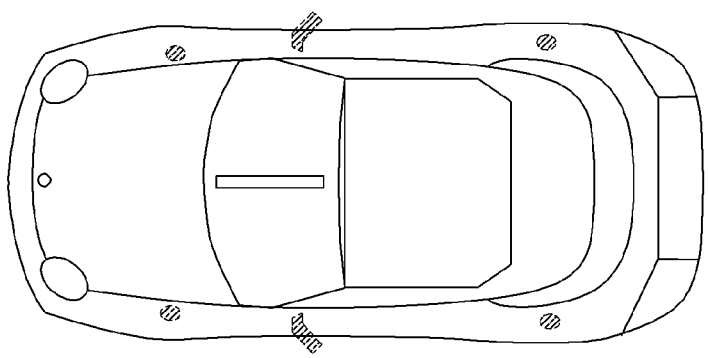
FIG. 2 illustrates an example of a distributed antenna system (DAS) considered in the present invention.
Figure 2:
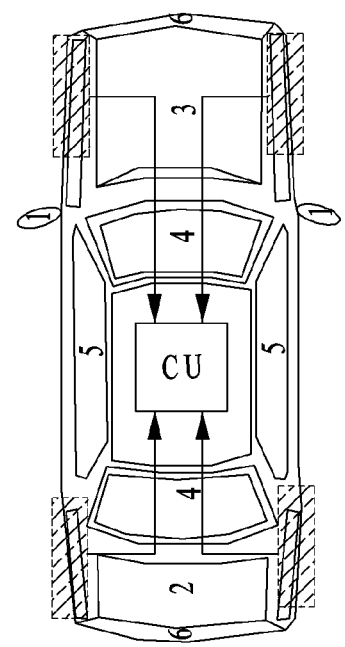
Figure 2:

FIG. 2 illustrates an example of a distributed antenna system (DAS) considered in the present invention.

Antennas having various shapes and radiation patterns according to their mounting positions are distributed and arranged in various places in a vehicle, and a central unit (CU) for controlling transmission and reception of signals through the distributed antennas is also installed. The reception diversity gain through use of the antenna array configured as shown in the figure may be maximized. In addition, through cooperative reception between the antennas having different radiation patterns, wireless connection between the eNB and the vehicle reception end may be prevented from being lost even in high-speed travel, in which the communication environment changes abruptly.

The antenna unit which is deployed in a distributed way like FIG. 2 can be called distributed unit (DU). Hereinafter, a 'DU' refers to an antenna sub-array or an antenna unit.

Figure 3:
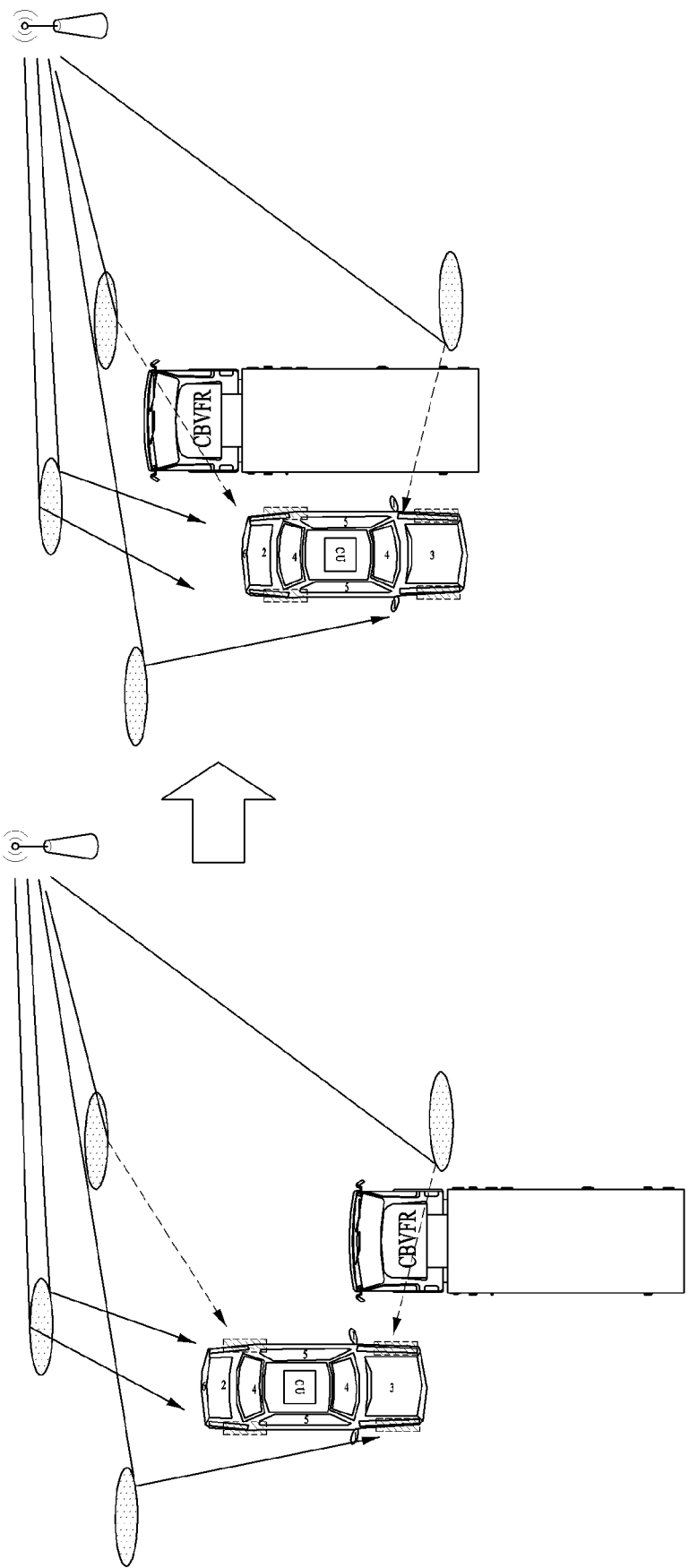
FIG. 3 illustrates advantages of the distributed antenna system when ray-blocks are present.

FIG. 3 illustrates advantages of the distributed antenna system when ray-blocks are present. FIG. 3 shows the reason why the DAS has advantageous in preventing link failures compared to traditional antenna array. In vehicle communications, when an obstacle (e.g., large size vehicle, such as a truck) moves with similar speed to the vehicle and Rx signal is received from the obstacle-presenting side, there might be communication failure for a relatively long time period. However, with DAS shown in FIG. 3, Rx signals received from the network can have a plurality of different paths, thereby communication failure problem caused by the obstacle can be solved.

In FIG. 3, a device at a network end that transmits signals to UEs located in a vehicle may be an eNB of a conventional communication system, and may be a roadside device or a roadside unit that supports vehicular communication. As shown in FIG. 3, a signal transmitted from the device at the network end may be directly received by the vehicle, or may be received via a path of reflection from a specific object.

As described above, DAS is advantageous in securing connection stability, and a high data rate may be supported by obtaining a large antenna gain through DAS. Accordingly, DAS is well suited for vehicle communication systems. However, the DAS has a burden of installing a lossless cable between the CU and a plurality of antennas. If each of the distributed antennas (or sub-antennas) merely serves to receive an RF baseband signal and deliver the same to the CU, cables for a high frequency band for sharing the RF signal should be installed between the antennas and the CU. These cables are not only costly, but also sensitive to physical stimuli such as movement and impact. Thus, it is difficult to implement these cables. In addition, it is also very difficult to restore a fault at the reception end.

In order to address this issue, DAS is preferably implemented in a manner that a modem operating independently is installed in each of the distributed antennas (or sub-array antennas) or that a part of the reception operation is independently performed on the distributed antennas, and the baseband signal, the soft value, and the digital processing process are shared between the distributed antennas and the CU.

2. Cell Selection in DAS

As described, DAS is a proper array solution for a communication system for vehicles to overcome communication performance reduction in case of a ray-block and link failure occurrence, and to enhance receiving power gain through large array antenna in DAS. However, to obtain practical gain in mobile communication system through the antenna structure, proper access management method should also be applied.

The conventional connection control method, which focuses on a personal communication apparatus using a single antenna array is a receive power-based access control method in which an eNB that is most suitable for providing a service for the UE is selected by comparing the receive powers of reference signals (RSs) for cell search sent by respective eNBs. Such receive power-based access control method fails to provide a function of considering rich rays to prevent performance deterioration due to a ray block and a function of comparing the reception diversity gains.

Figure 4:
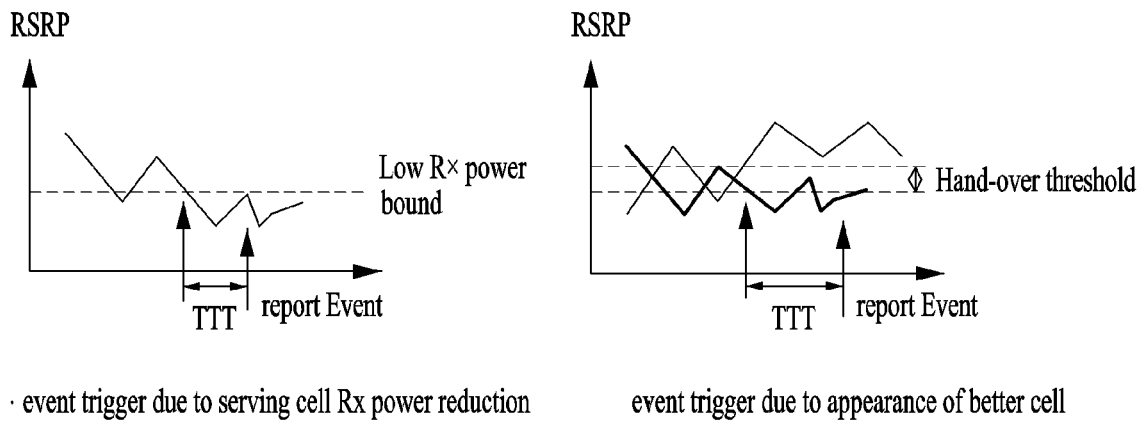
FIG. 4 illustrates a diagram of Radio Resource Monitoring (RRM) measurement scheme for selecting eNB/cell.

FIG. 4 illustrates a diagram of Radio Resource Monitoring (RRM) measurement scheme for selecting eNB/cell.

In FIG. 4, to request an eNB/cell change to serving eNB by a UE, 'event' notifying the eNB/cell change is needed should be triggered. The 'event' is triggered when 1) received power of cell search reference signal from the serving cell is lower than a predetermined value and access point change to another eNB/cell is required to be considered, 2) cell search reference signal from another cell is received with higher power than the signal from the serving cell for a predetermined time period and thus it is determined that an eNB/cell which is more proper than the serving eNB/cell exists, or 3) the case 1) and the case 2) simultaneously and/or sequentially occur. When the 'event' is triggered, the network or the serving cell requests to the UE for more detailed channel situation measurements and report, performs/commands serving cell change, or maintains the current state due to various network factors which is not recognized by the UE (e.g., traffic balancing).

Figure 5:
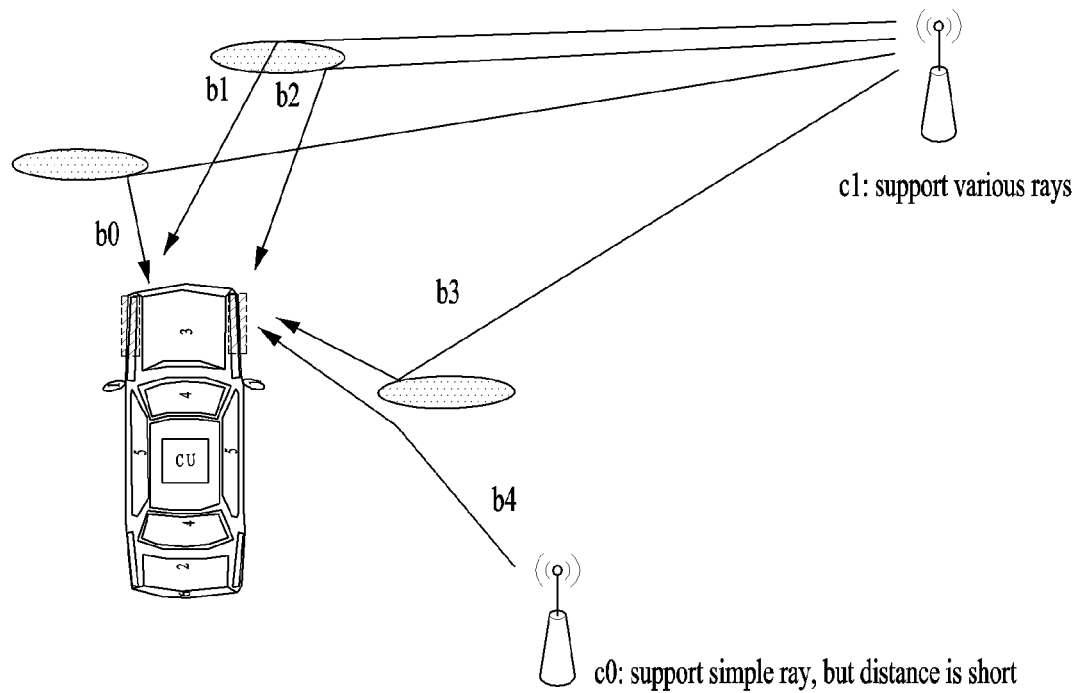
FIG. 5 illustrates a problem of traditional cell selection method based on Rx power and also illustrates one exemplary embodiment of cell selection method according to the present invention.

FIG. 5 illustrates a problem of traditional cell selection method based on Rx power and also illustrates one exemplary embodiment of cell selection method according to the present invention.

In FIG. 5, vehicle performs measurement for a cell search reference signal from a cell 1 (c0) and reports a result to the c0, since the vehicle is close to the c0. However, when an obstacle exists between the vehicle and the c0, a link failure may happen since only one ray is received from the c0. On the contrary, a cell 2 (c1) can support a communication with various rays, even though the c1 cannot provide signals to the vehicle with high receiving power since the vehicle is far away from the c1. Thus, link between the vehicle can be stably maintained even the obstacle is present. When the vehicle moves in high speed, a cell selection should be performed by considering information with regard to the 'ray distribution'.

To generate proper Tx beams in a Tx end, channel information should be identified and a gain when generated beams are used should also be specifically measured. The channel information can be obtained by transmitting additional pilot signal from the Tx end to the Rx end. However, in current communication system, the Rx end measures channel and reports it back to Tx end in a format of Channel State Information (CSI). The channel information can be defined as a combination of sub-channels generated among a plurality of Tx/Rx antennas, and thus the Channel information gets more complex as the number of Tx/Rx antennas in MIMO system is increased.

Meanwhile, method for reporting the channel information can be divided into 1) explicit CSI reporting and 2) implicit CSI reporting. Explicit CSI reporting is a scheme that Rx end reports information as close as possible to the measured value without any interpreting the measured channel. In explicit CSI reporting, quantization for the MIMO channel and/or SVD (Singular Value Decomposition) operation are also applied to reduce signaling overhead.

Implicit CSI reporting is a scheme that Rx end reports information needed to generate beams at the Tx end instead of the measured channel, by interpreting the measured channel information itself. The implicit CSI reporting scheme is used in current mobile communication system because of the small signaling overhead required in CSI reporting.

According to large antenna array implemented as in-vehicle DAS, the vehicle can obtain high link stability and high data rate since high rank downlink transmission occurs with high probability than conventional personal mobile communication device. To support high rank downlink transmission, a plurality of transmission beams should be precisely controlled when the plurality of transmission beams are simultaneously transmitted. Since traditional standards are focused on transmission beam control with low rank transmission, there is a burden of correcting the current standard specifications. Specifically, the current standard specifications should be changed in view of the followings:

1) when supporting high rank transmission/reception, more various beam measurement and generation should be supported (in current standards, one rank 8 precoder and 16 rank 2 precoders are defined)

2) user data rate (throughput) should be guaranteed even when a part of codeword fails to be transmitted and/or a part of connections is blocked, in case of a simultaneous transmission of a plurality of codeword (transport block)

To support the above-mentioned two points, new codebook should be newly defined, and structural of a downlink MIMIO transmission end should also be changed to increase the number of codewords simultaneously transmitted. And, when a structure of a codebook which is used for CSI measurement for high rank transmission is changed, resources for CSI reporting are also increased. Therefore, another device to which high-rank reception is not essential may also increase feedback overhead, which may result in degradation of overall frequency efficiency. This issue should be addressed. Alternatively, system performance may be degraded as the number of devices capable of simultaneously accessing a network is reduced due to lack of capacity of an uplink control channel. This issue should also be considered.

3. Virtual UE Scheme in DAS

Each of DUs of in-vehicle DAS structure is physically distributed apart from each other, and is designed to possess different radiation patterns according to its position of the vehicle due to metal surface characteristics of the vehicle. And, by a reflect and a propagation at the metal surface, channels between eNB and each of the DUs have low correlation and are relatively independent than channels of conventional linear antenna array structure.

By using this, each of DUs or a part of DUs can be grouped so that grouped DUs operate as if they are one user equipment (or device) independent from other not-grouped DUs. That is, DUs belonging to one vehicle are reported to network entry as if they are one single independent UE, and high rank transmission/reception is performed through the one single independent UE. Hereinafter, the above-mentioned scheme is called 'virtual UE scheme', and the one single independent UE which consists of one or more DUs is called 'virtual UE (VUE)'. By designating the VUE, problems of standardization and implementation can be resolved and following advantages can be obtained at the same time.

1) By designating VUE, QoS management does not have to be performed for each of the DUs and can be controlled throughout one single bearer: some entry of the network but eNB can recognize the vehicle composed of multiple VUEs as one single user.

2) Multi-user channel is established between the eNB and the vehicle, and the eNB proceeds to control transmissions to each of DUs of the VUE and receptions of feedback from each of DUs of the VUE. Thus, other conventional devices are not affected by the virtual UE scheme.

Figure 6:
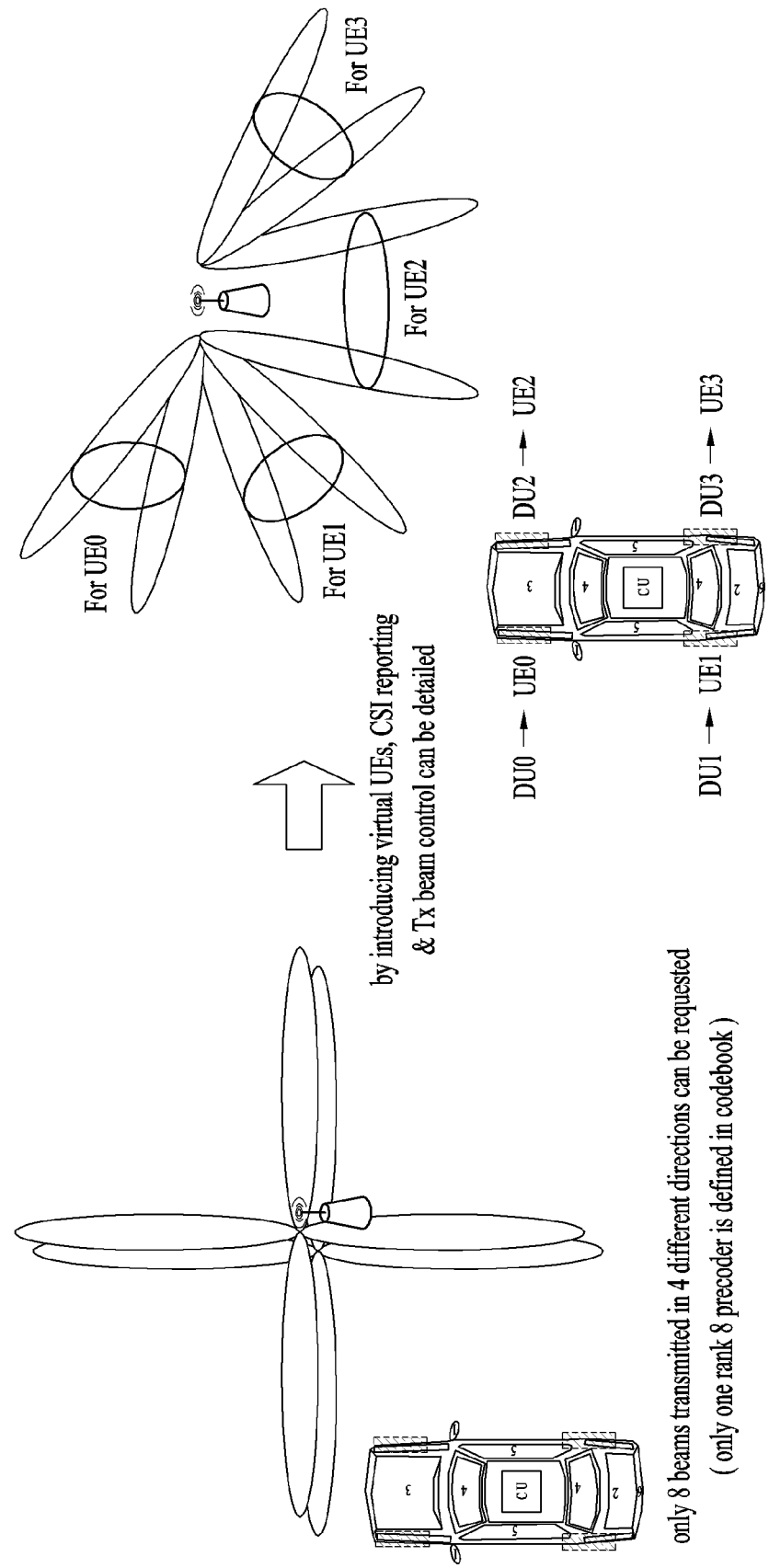
FIG. 6 is a diagram of detailed Tx beam control by introducing virtual User Equipment (VUE).

FIG. 6 is a diagram of detailed Tx beam control by introducing virtual User Equipment (VUE).

As can be seen from FIG. 6, DU0, DU1, DU2, and DU3 are designated as 4 VUEs of UE0, UE1, UE2, and UE3, respectively. Before considering virtual UE scheme, the vehicle is considered as one single UE by the eNB and only 8 different Tx beams can be used since only one rank 8 precoder is defined in the codebook. On the contrary, as per the virtual UE scheme, 2 Tx beams can be allocated for each of 4 VUEs and one of 16 different Tx beam combinations can be selected and used for each of 4 VUEs.

Figure 7:
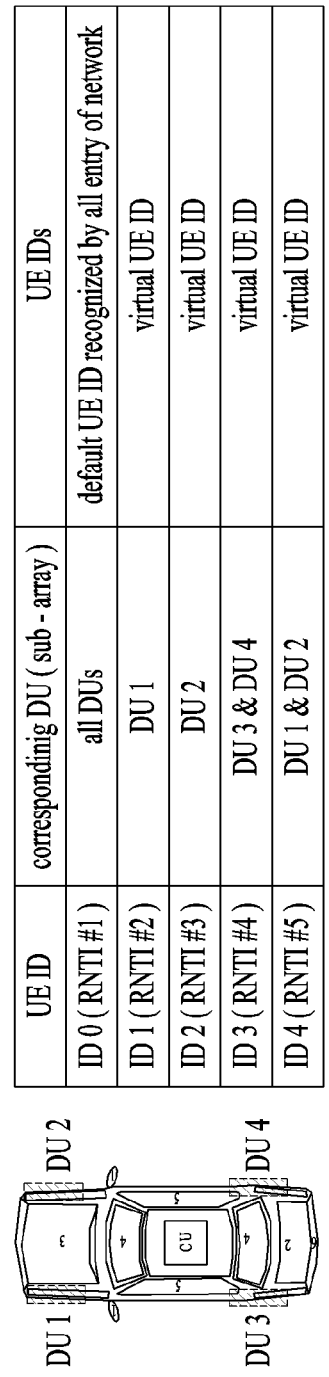
FIG. 7 shows an exemplary embodiment of defining a plurality of virtual UEs and corresponding UE IDs.

FIG. 7 shows an exemplary embodiment of defining a plurality of virtual UEs and corresponding UE IDs. FIG. 7 shows a case that a vehicle is configured with 4 DUs and one CU connecting the 4 DUs.

The vehicle can define a VUE with a combination of one or more DUs. Each of VUEs can be configured with different combination of DUs and physical characteristics of each of the VUE are configured differently each other. Or, each of VUEs can be configured to share one or more DUs so that Multiple Access Interference (MAI) caused by MU-MIMO access can be efficiently controlled. Or, each of VUEs can be configured to include different number of DUs, thereby Rx performance/complexity can be set differently for the each of VUEs. And, specific combinations of DUs (i.e., specific VUE) can be registered as a default user.

Here, one VUE can be differed from other VUEs in at least one of physical layer ID, cell specific UE ID (RNTI), and Rx antenna indication, etc. That is, different indication is allocated for each of VUEs so that eNB or a part of entry of a network recognizes the differences between target (or, destination) of data transmission.

4. First Proposed Method for Accessing a Network in DAS

Hereinafter, a proposed method for connecting a network in DAS by using the aforementioned virtual UE scheme is described. In the proposed embodiment, "substantial UE (SUE)" is defined first. When a plurality of VUEs is registered with/connected to a network, a part of network entries (for example, an eNB or an MME) can individually recognize the plurality of VUEs. On the contrary, the other network entries do not distinguish between VUEs but merely recognize the same as one SUE. In other words, the proposed embodiment method can be understood as a network transparent UE scheme in which only some network entries recognize presence of a user and the other network entries fail to recognize presence of the user.

Hereinafter, the 'SUE' is defined as one of the following:
1) A UE defined with one global UE ID
2) A UE performing communication to support one service
3) A UE firstly establishing connection with the network among different combinations of DUs
4) A UE recognized as one device by network entries (except for an eNB or MME which recognizes that the virtual UE scheme is applied)

On the contrary, "VUE" is defined as a UE establishing a connection with eNB through an additional access procedure (e.g., a random access procedure or RACH procedure) with a combination including one or more DUs. By allowing the SUE to add/register connections of a plurality of UEs (i.e., VUEs), the proposed embodiment may ensure performance of a new UE requiring high performance such as a vehicle, with high rank transmission, an increased number of codewords that can be received simultaneously, and enhanced degree of scheduling freedom (resource allocation).

The proposed embodiment is intended to support the vehicle with high rank transmission by using the virtual UE scheme without influencing the operation of the existing mobile communication system supporting conventional devices. To this end, an embodiment using a virtual UE scheme which does not affect network configurations such as a bearer will be described.

Figure 8:
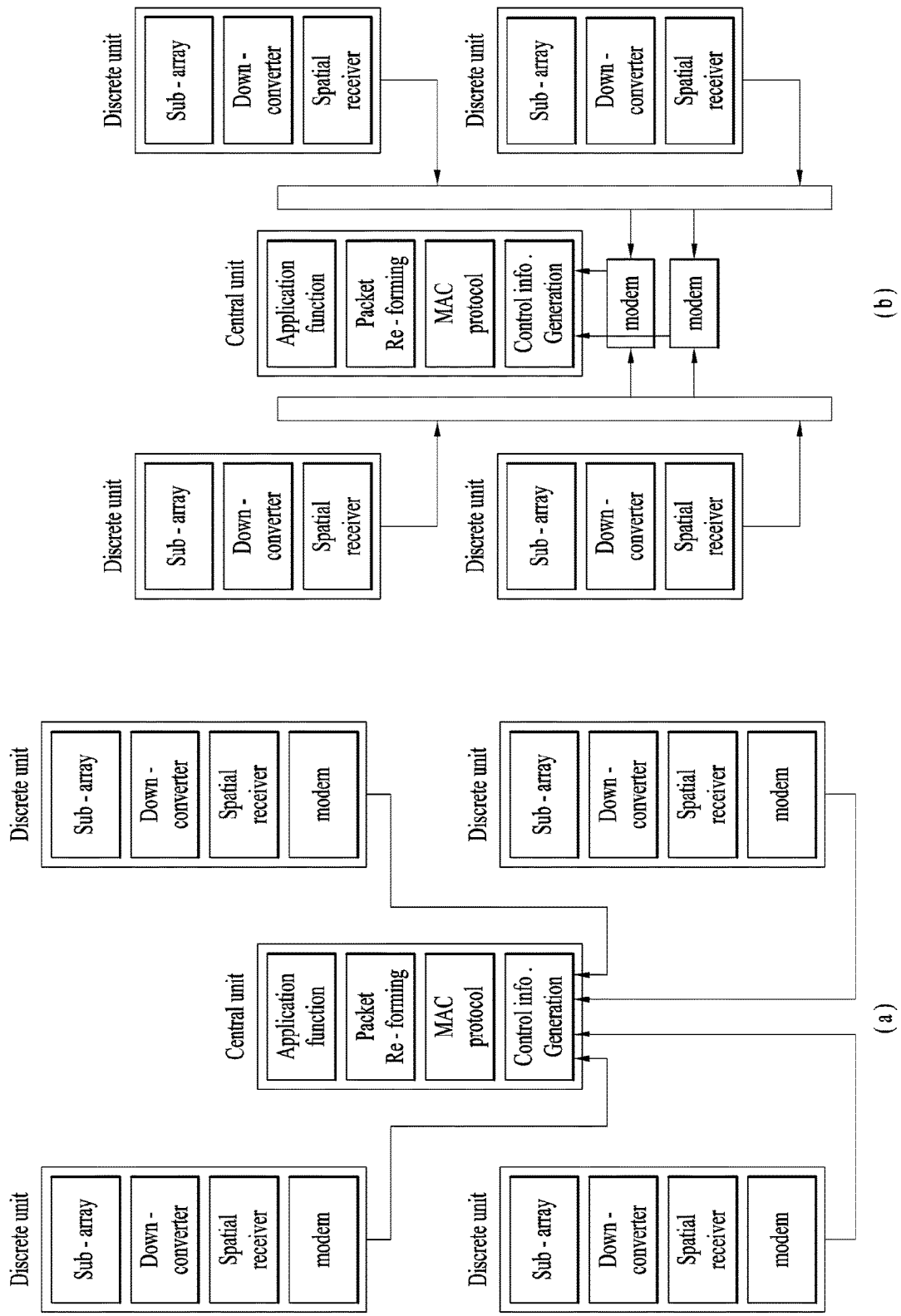
FIG. 8 is a block diagram of a device supporting a virtual UE scheme.

FIG. 8 is a block diagram of a device supporting a virtual UE scheme.

One exemplary embodiment of a device supporting the aforementioned virtual UE scheme is shown in FIG. 8. In FIG. 8, the device (or UE) consists of one CU determining content of control information to be transmitted to an eNB and a method of reporting the control information and a plurality of DUs receiving a downlink signal. Further, the device may include one or more modems which primarily demodulate the received information, and a connection between the DUs and the modem may be fixed, as shown on the left side of FIG. 8, or may be floating, as shown on the right side of FIG. 8. Not only does the CU generate control information, but it also performs physical layer or higher layer operations such as reconstructing serving packets from the received information and executing applications. In FIG. 8, each of DUs is not a mere antenna, but may perform a decoding procedure, a MIMO-related procedure, a CSI measurement/reporting procedure, and the like.

Figure 9:
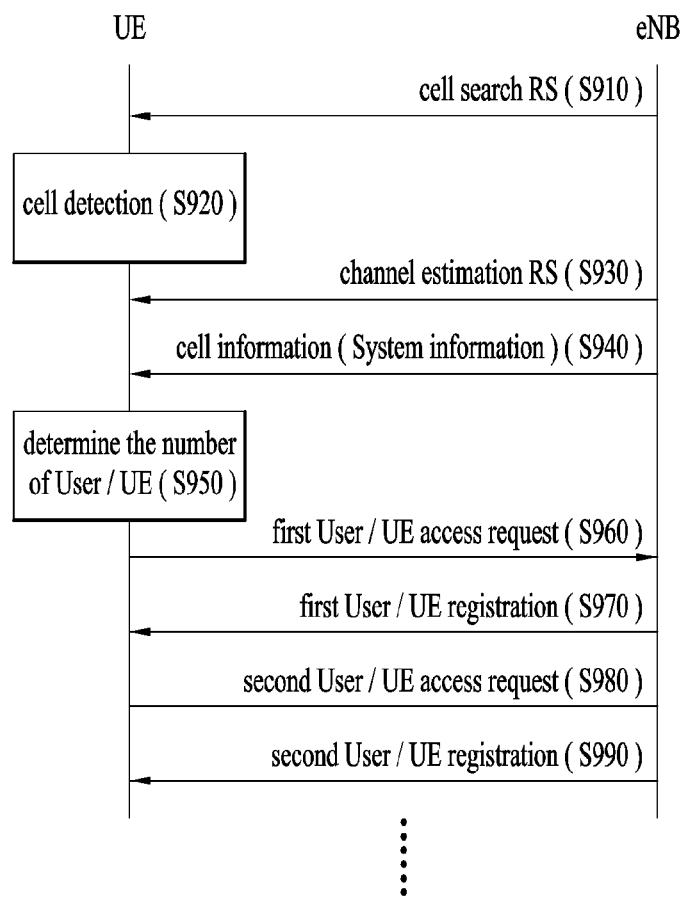
FIGS. 9 and 10 show exemplary embodiments of a method for accessing a network by using virtual UE scheme of a device.
Figure 10:
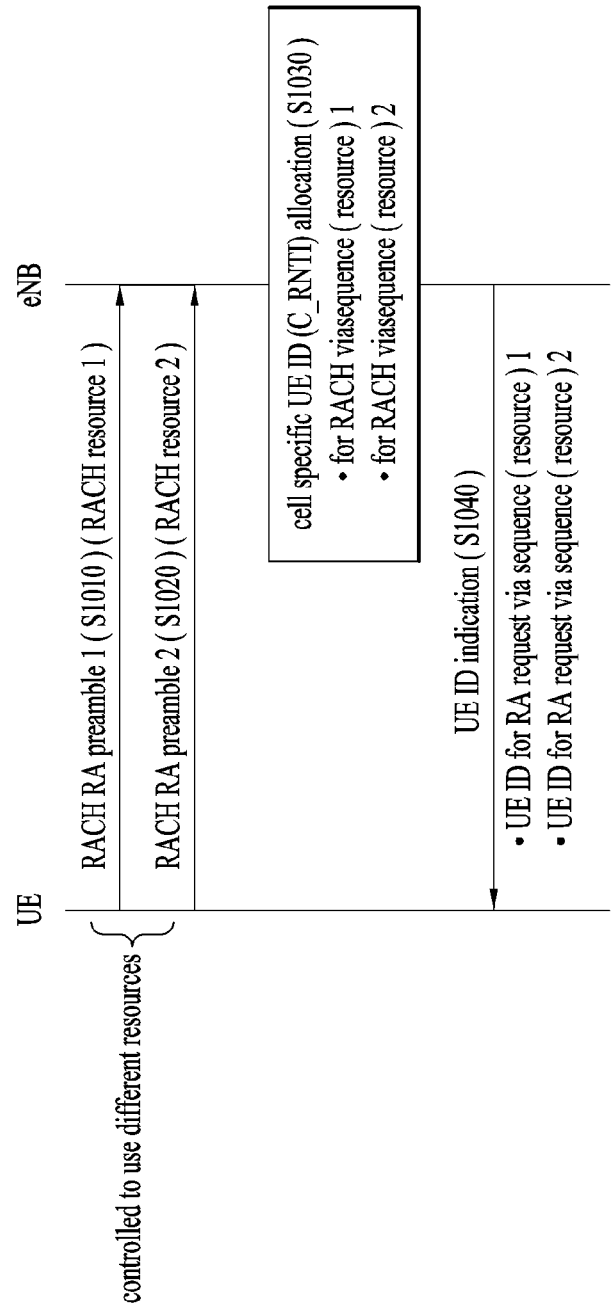

FIGS. 9 and 10 show exemplary embodiments of a method for accessing a network by using a virtual UE scheme.

In FIG. 9, the UE according to an embodiment makes a request to the eNB for access of a plurality of users by performing the RACH procedure (or random access procedure) several times. Here, the UE firstly making a request to the eNB for access becomes the "SUE", and a UE subsequently making a request to the eNB for access becomes the "VUE".

When the UE receives a reference signal (RS) for cell search from the eNB (S910), the UE performs cell search (or cell detection) (S920). After the cell search process, the UE synchronizes with the eNB and performs measurement for the eNB using the received channel measurement RS (S930), so that the UE is ready to receive system information from the eNB which is a temporarily selected as a serving cell for the UE. Subsequently, when the UE identifies characteristics of the cell by receiving the system information from the eNB (S940), the UE determines the number of access requests to be made to the eNB by using the virtual UE scheme (S950). The number of access requests to be made may be determined when access of multiple users/UEs is needed in accessing a cell for a reason such as lack of the number of transmission antennas.

Subsequently, the UE performs the access request procedure according to the number determined in S950 (i.e., the number of users/UEs to be registered). For example, when the UE receives the system information and recognizes that the eNB is a legacy eNB, the UE may determine that two access procedures are required to support high rank transmission and multi-codeword Tx/Rx. Then, the UE establishes a connection with the eNB as an SUE through a first access request procedure (S960, S970). Subsequently, the UE establishes another connection with the eNB as a VUE through a second access request procedure (S980, S990). That is, two different DU groups independently establish connections with the eNB. At this time, in order to apply the virtual UE scheme to the legacy eNB having no function of identifying the VUE, the UE performs the first access request procedure and the second access request procedure in the same process.

In one exemplary embodiment, when the UE transmits multiple access requests to the eNB, the access procedures may be performed so as not to conflict (or contend) with each other. For example, when access request procedures are performed using RACH processes, two RACH processes should be distinguished from each other so as to avoid potential contention. Specifically, upon receiving the system information from the eNB, the UE may identify RACH preamble sequences which are available to the eNB. Thus, the UE may select two RACH preamble sequences from among the available sequences and allocate the selected sequences to the two RACH processes, respectively.

Here, the UE may randomly select two RACH sequences or may randomly select one RACH sequence and then select the other sequence by adding an offset corresponding to 'i' to the index of the selected sequence. In a general sense, selecting sequences may be understood as allocating physical resources for RACH processes. That is, by selecting two different sequences, different physical resources are allocated to two RACH processes.

Meanwhile, the eNB detects resources (e.g., RACH sequences, time slots, or the like) used for the RACH processes, thereby recognizing the two different access requests from the UE. The eNB assigns (or allocates) a unique UE ID, namely C-RNTI (Cell Radio Network Temporary Identifier), to each of the UEs (one SUE and one VUE). Since the RACH processes are performed using different RACH preamble sequences and/or resources, contention does not occur, and the eNB may recognize the two different RACH processes as processes distinguished from each other.

In another exemplary embodiment, the UE may perform an additional access request procedure while operating in connection with the eNB. That is, the SUE may not only perform initial access to a cell, but also perform an additional access procedure of a user/UE upon determining that the number of users/UEs needs to be increased according to a channel change after access or during communication. In other words, the SUE may perform a request procedure such that an additional connection is established between the eNB and one or more VUEs. At this time, the additional connection procedure of a user/UE may be performed irrespective of the operation of the current SUE if the uplink transmit power of the UE is sufficient. That is, communication via the SUE pre-registered with the eNB and the new UE ID assignment process are performed independently.

In another exemplary embodiment, the UE may perform the multiple access request procedures simultaneously. As shown in FIG. 10, the UE may perform RACH processes simultaneously by transmitting two different RACH preamble sequences 1 and 2 to the eNB at the same time (S1010, S1020). Of course, the UE should use different RACH preamble sequences for the two different access request procedures, and should use different RACH resources to avoid any contention.

The eNB allocates two different UE IDs for the two different RACH processes (S1030), and notifies the UE of the two allocated UE IDs (S1040). In this case, one UE ID may be allocated to the SUE and the other UE ID may be allocated to the VUE.

Figure 11:
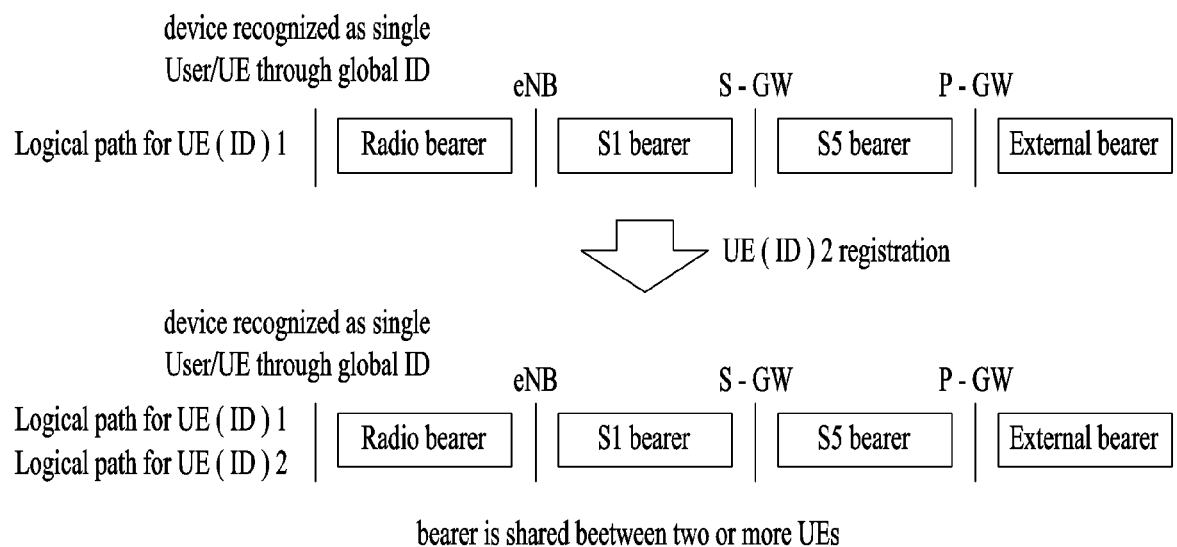
FIG. 11 is a diagram for a bearer configuration when a virtual UE scheme is applied.

FIG. 11 is a diagram for a bearer configuration when the virtual UE scheme is applied.

When network entries including the eNB recognize that the UE requesting connection establishment is a VUE according to a virtual UE scheme, the network entries add the VUE to a connection preconfigured for the SUE, rather than making a request to the upper network entries for a new bearer configuration for the VUE. That is, a bearer which is already configured for the SUE is shared with the VUE.

As an initial connection is established between the eNB and SUE, each of the network entries sets up a logical path for the SUE and the network connection of the SUE is configured by combining the logical paths. The implemented network supporting data flow through organized configuration as above is called a "packet define network". According to the proposed virtual UE scheme, the eNB among the network entries distinguishes between the SUE and the VUE independently to control radio links. However, network entries other than the eNB recognize the SUE and the VUE as one single UE. As shown in FIG. 11, as the eNB capable of distinguishing between the VUE and the SUE recognizes an access request from the VUE, the eNB shares a preconfigured bearer for the SUE with the VUE. Here, a global ID is shared between the SUE and the VUE, while the UE ID differs between the SUE and the VUE. In other words, the bearer configured for the pre-registered UE (SUE) sharing the global ID is shared with the new UE (VUE).

Figure 12A:
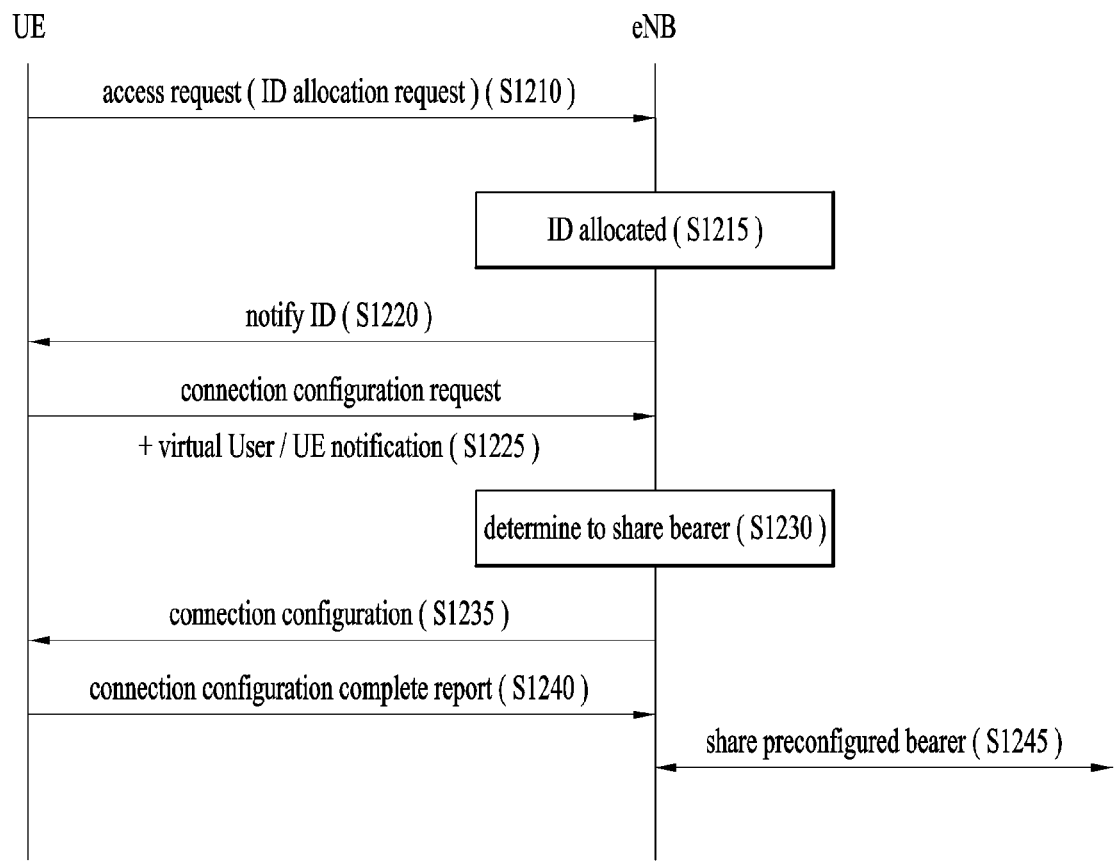
FIGS. 12A and 12B show exemplary embodiments of method for accessing a network by using virtual UE scheme of a device.
Figure 12B:
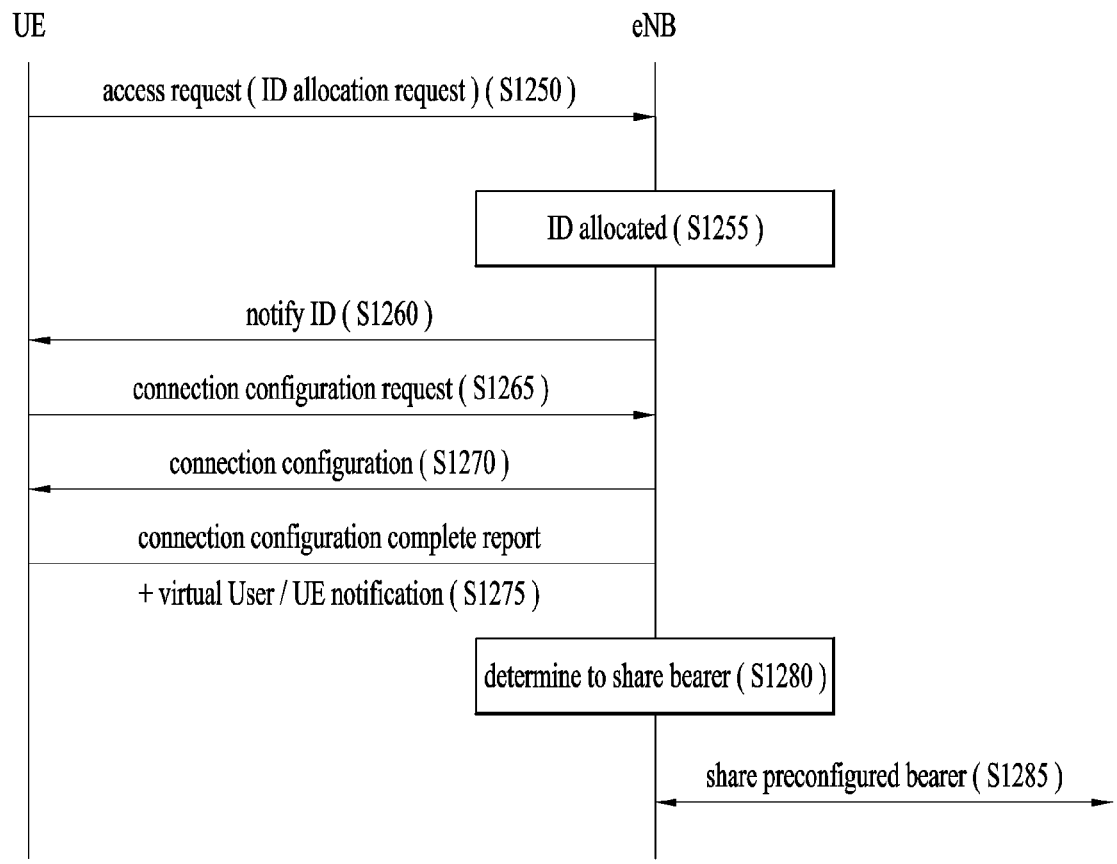

FIGS. 12A and 12B show exemplary embodiments of the method for accessing a network by using a virtual UE scheme.

When the virtual UE scheme is applied, the UE should notify the eNB and other network entries that the access request procedure is intended for a VUE. To perform common QoS management by sharing the same bearer between the SUE and the VUEs, a specific network entry should be able to distinguish the VUEs from the SUE. As mentioned above, the specific network entry may be the eNB. Thus, the SUE requesting connection establishment should notify the specific network entry that the requested connection establishment is intended for a VUE. Alternatively, to avoid affecting the existing communication system, the notification procedure may be performed by the VUE requesting connection establishment.

In FIG. 12A, a request for initial access is made between the UE and the eNB (S1210, S1215, S1220). Through the subsequent access request procedure, the UE notifies the eNB that the UE is a VUE and no additional bearer configuration is needed for the UE (S1225). This notification procedure may be performed through the RRC configuration request procedure. Upon receiving the connection configuration request message from the UE, the eNB identifies the UE as a VUE and determines to share the bearer of the SUE with the VUE (S1230). The eNB informs the VUE that the connected UE is the VUE (S1235) and receives an acknowledgment from the VUE (S1240). Subsequently, the eNB shares the preconfigured bearer with the VUE (S1245). As the preconfigured bearer is shared, the procedure of configuring a new bearer is omitted.

In FIG. 12B, in contrast with FIG. 12A, the UE notifies the eNB that the UE is a VUE after a new connection is configured (S1275). The other procedures may be operated similarly to the procedures of FIG. 12A.

FIGS. 13A, 13B, 13C and 14D show exemplary embodiments of message configurations when the virtual UE scheme is applied. Hereinafter, exemplary embodiments for notifying network entries of application of the virtual UE scheme will be described.

When a VUE requests a connection, it may notify the network that the access is requested for communication according to a virtual UE scheme. Specifically, this embodiment may be implemented by transmitting information indicating "virtual UE scheme" in the "establishment cause" field of the access/connection request message implemented in the communication system. Alternatively, a UE ID (e.g., C-RNTI, MME-specific ID, global ID, etc.) of the SUE to share the bearer may be transmitted over or in place of the aforementioned message.

Figure 13A:
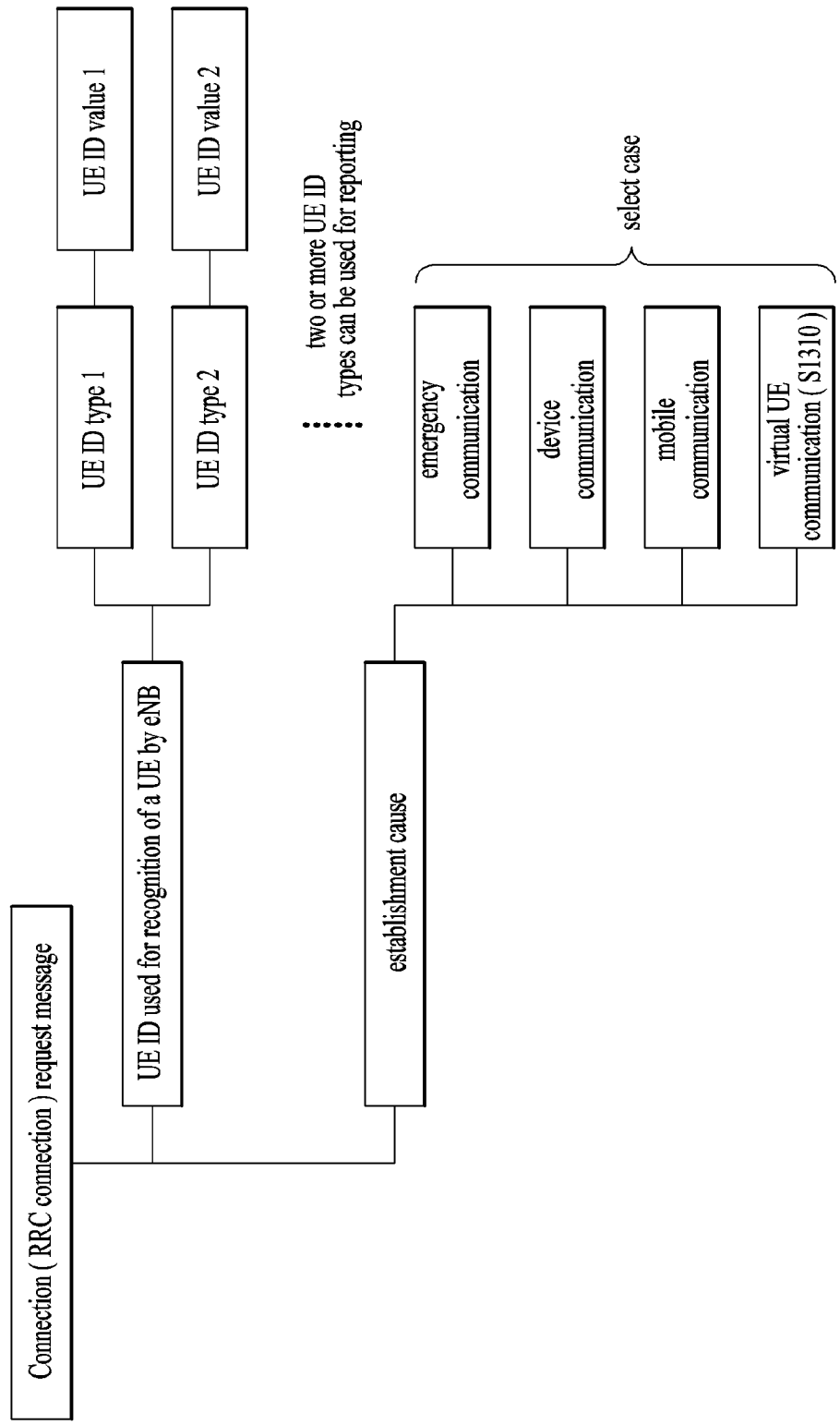

FIG. 13A shows an example of a message configuration used in an access/connection request procedure. As shown in FIG. 13A, the 'establishment cause' field of the connection request message may include information indicating "virtual UE communication" (S1310). In addition, the UE ID field of the message may include information on one or more grouped DUs including the VUE.

Figure 13B:
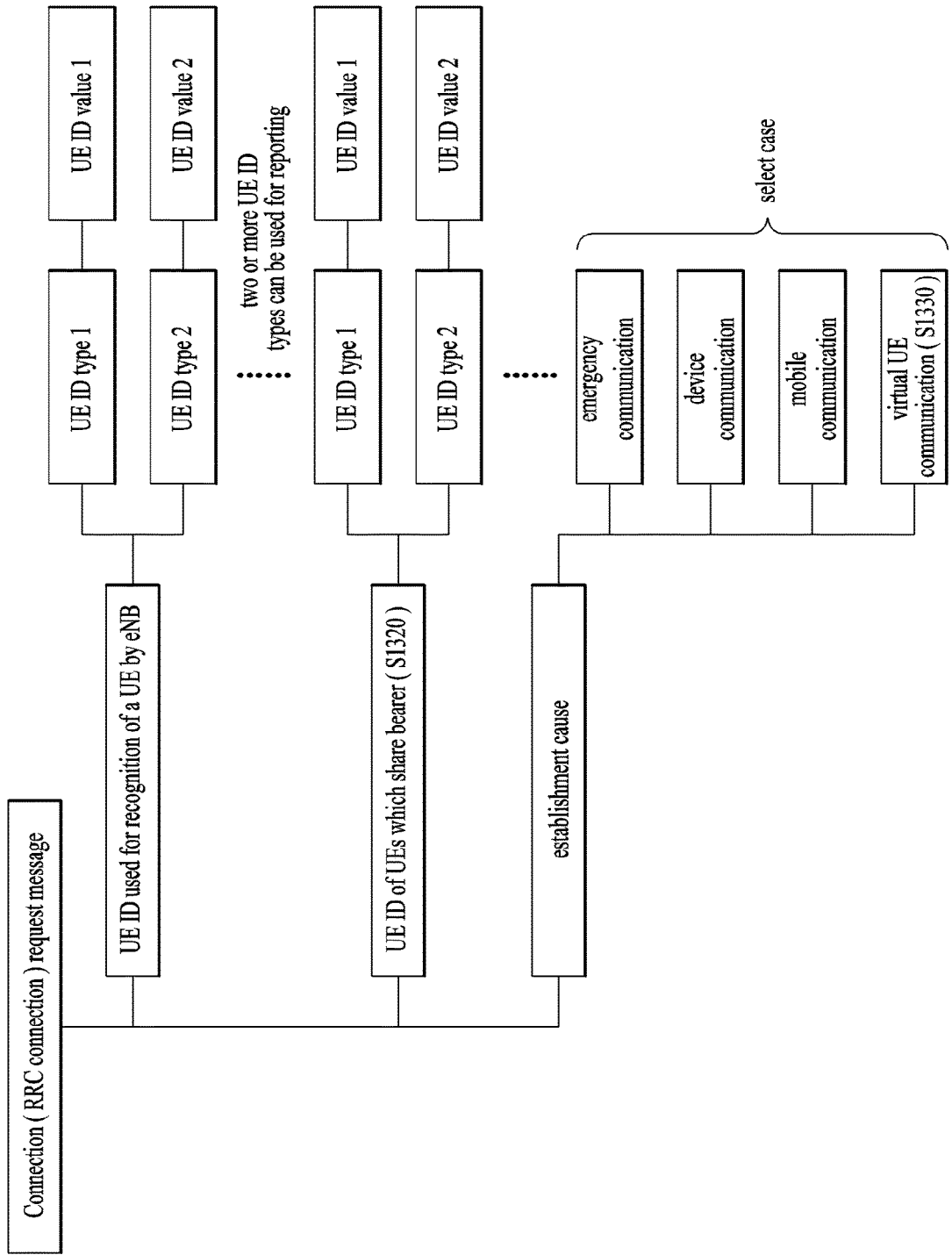

FIG. 13B shows another example of a message configuration transmitted to the eNB. In FIG. 13B, a 'UE ID of UE to share bearer' field (S1320) is added to the embodiment of FIG. 13A. That is, by transmitting the UE ID of an SUE to share a bearer, the VUE may notify the eNB that the virtual UE scheme is applied. In the case where the UE ID of the SUE is transmitted to the eNB, the information indicating the 'virtual UE scheme' of the 'establishment cause' field (1330) may be omitted.

Figure 13C:
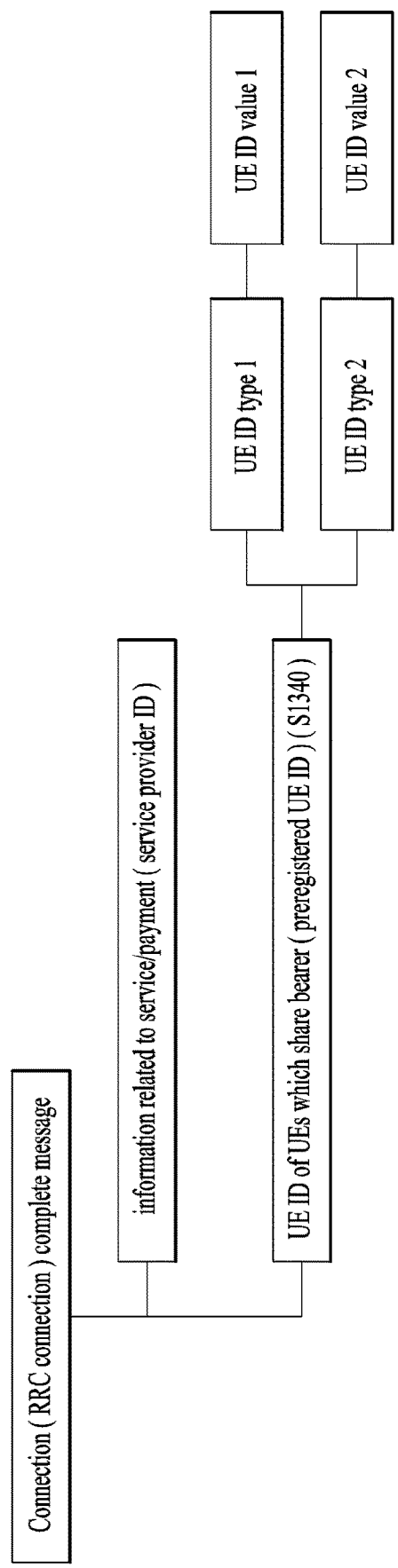
Figure 13D:
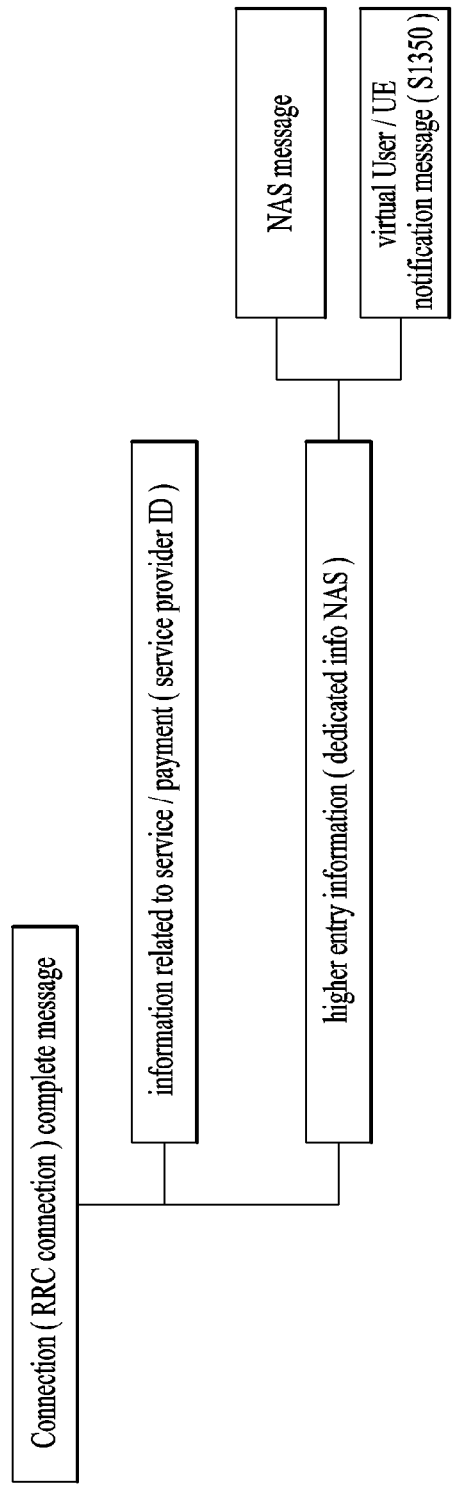

FIG. 13C and FIG. 13D show example configurations of another message transmitted from the VUE to the eNB. The message structures of FIGS. 13C and 13D may correspond to the embodiment in S1275 of FIG. 12B.

Unlike FIGS. 13A and 13B, the procedure of notifying the eNB of the virtual UE scheme may be performed after a connection is established between the VUE and the eNB. This is because it is not essential for the eNB to recognize that the connection request procedure is intended for a VUE. Thus, the notification operation (S1340) may be performed through upper layer signaling that notifies the eNB of completion of connection establishment. For example, an RRC connection complete message may be used for this embodiment.

FIG. 13D illustrates an embodiment of notifying upper network entries other than the eNB of the virtual UE scheme to ease burden of the eNB. That is, an upper network entry which is directly involved in bearer configuration may be notified that the connection request procedure has been performed for a VUE through a virtual UE process since the eNB is not directly involved in the bearer configuration. In another embodiment, the upper network entry which is directly involved in bearer configuration may recognize the VUE. In this embodiment, a message which is not intended for the eNB but for an upper network entry, such as, for example, the NAS message, may be used. That is, the higher entry information field of a specific message may include information indicating that the virtual UE scheme is applied (S1350).

Figure 14:
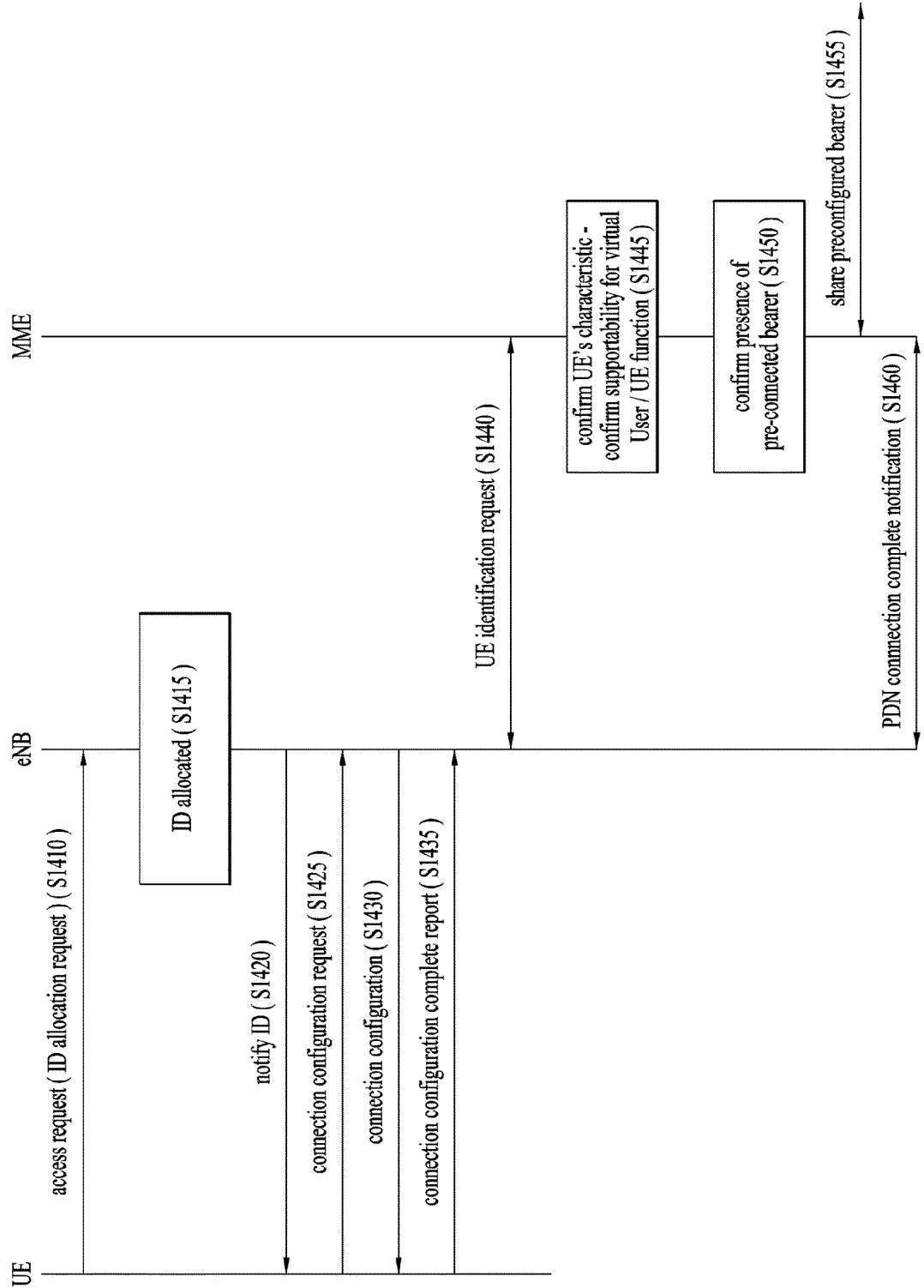
FIG. 14 shows exemplary embodiments of a method for accessing a network by using a virtual UE scheme of a device.

FIG. 14 shows exemplary embodiments of a method for accessing a network using a virtual UE scheme.

In an exemplary embodiment, a virtual UE scheme which requires no additional signaling for the UE may be implemented. That is, the UE does not transmit any information to the eNB. Instead, the eNB may recognize that the UE is a VUE through exchange of information between network entries. Specifically, the UE does not transmit information on the virtual UE scheme to the eNB. Instead, an upper network entry that collects and analyzes UE IDs may recognize the UE ID of the VUE and determine that the virtual UE scheme is applied. Thereby, bearer sharing may be configured by the upper network entry.

For example, after a connection is established between the eNB and the VUE (S1410 to S1435), the eNB may report the UE ID and the characteristics of the UE to an MME which has information on UE IDs and request identification and authentication of the UE (S1440). The MME (or another upper network entry) receiving the request checks the characteristics of the UE and determines whether the UE supports a virtual UE scheme or not (S1445). If the UE supports the virtual UE scheme, the MME (or another upper network entry) checks if there is a bearer of the SUE to be shared with the VUE (S1450). If it is determined that there is an available preconfigured bearer, the MME uses the existing bearer with the VUE without configuring any new bearer (S1455), and notifies the eNB that PDN connection has been completed (S1460).

5. Second Proposed Method for Accessing a Network in DAS

FIGS. 15 to 18 illustrate other embodiments of a method for accessing a network by using the virtual UE scheme.

Embodiments in which the UE uses a procedure of establishing a new connection, such as a RACH procedure or a random access procedure, have been described. Alternatively, an embodiment may be implemented in which a new UE is added as an SUE through a preconfigured connection of the SUE.

Figure 15:
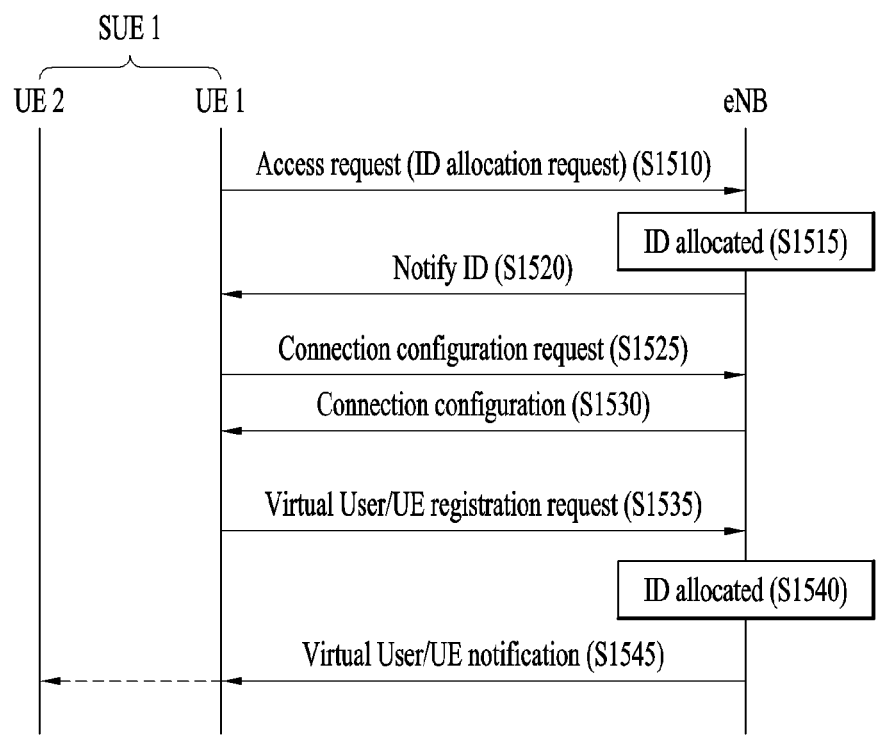
FIGS. 15 to 18 illustrate other embodiments of a method for accessing a network by using the virtual UE scheme.

First, in FIG. 15, UE 1 transmits an access request to the eNB, and the eNB approves the access request. Thereby, UE 1 is registered with the eNB and is assigned a UE ID. That is, the UE 1 becomes an SUE. The access request process is generally performed using resources different from those for other communication processes, and the number of UEs allowed to access the eNB simultaneously is limited according to the design of the access request channel Therefore, considering an environment where the number of UEs connectable to each eNB can be greatly increased through application of the virtual UE scheme, a method for implementing additional access of a UE needs to be considered. This is because implementing the access request process of UE 2, which is a new UE, in the same manner as UE 1, which is the SUE, may adversely affect the operation of the legacy UE.

According to one embodiment, UE 2 may make an access request to the eNB on a dedicated uplink channel pre-assigned to UE 1, which is an SUE. The dedicated uplink channel refers to a logical channel that uses radio resources separately allocated to a specific UE to support uplink transmission of the UE.

As shown in FIG. 15, the UE 1 is registered as an SUE with the eNB through S1510 to S1530. Subsequently, the SUE requests the eNB, on the uplink channel of a preconfigured connection, that the SUE be registered according to the virtual UE scheme of UE 2 (S1535). In response to the request, the eNB approves registration of the UE 2 and assigns a UE ID to UE 2 (S1540). Then, the eNB may transmit the approval for connection of UE 2 to UE 1 on the downlink channel of the SUE or directly to UE 2 (S1545).

Meanwhile, UE 2 accessing the eNB through connection of the UE 1 also constitutes one SUE along with UE 1. That is, a network entry other than the eNB capable of distinguishing between UE 1 from UE 2 may recognize UE 1 and UE 2 as one entry, and thus the same bearer may be shared for the two UEs.

Figure 16A:
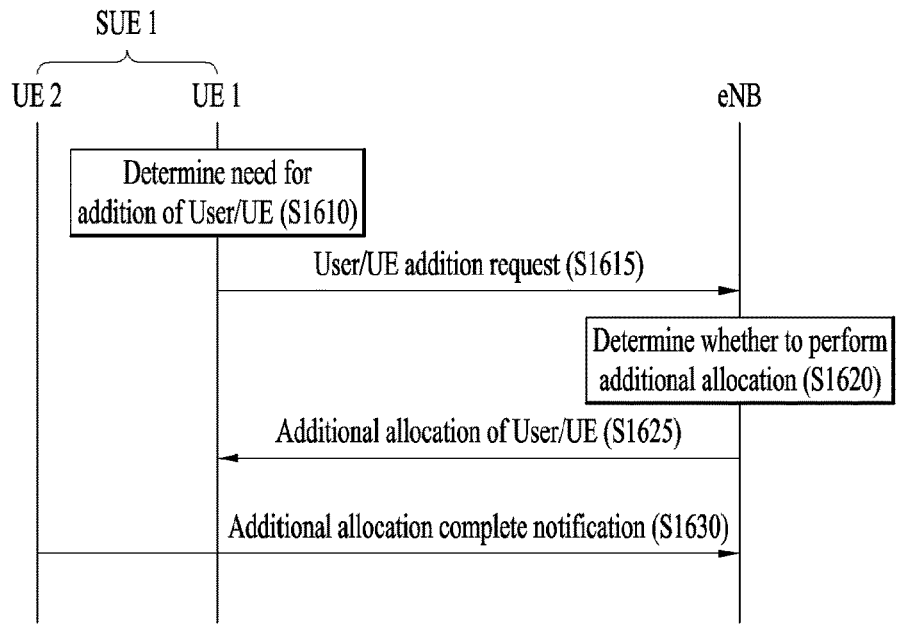
Figure 16B:
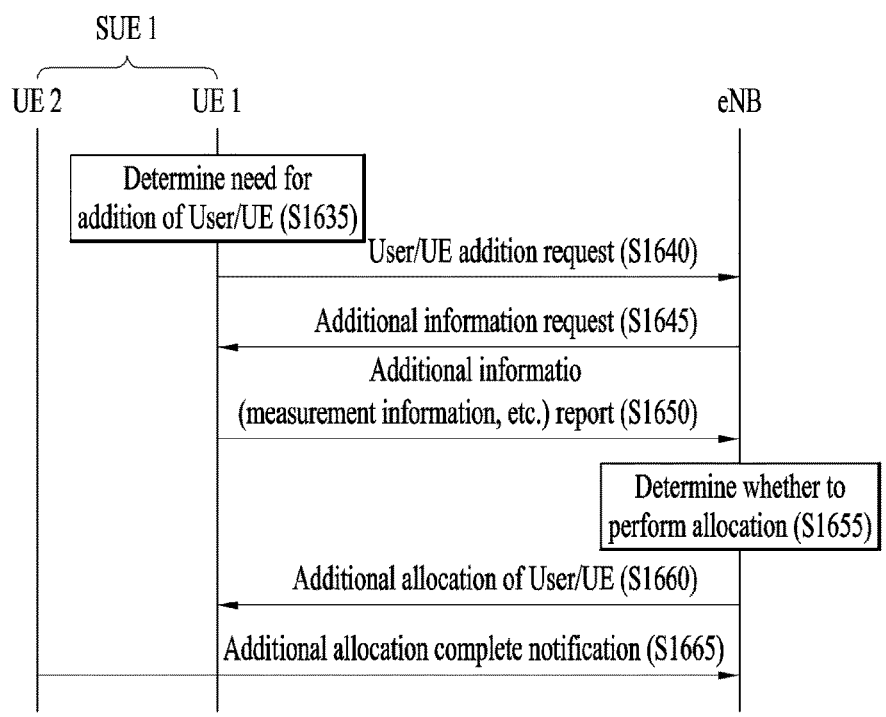

Next, FIGS. 16A and 16B show still another embodiment compared to the embodiment of FIG. 15. In FIG. 16A, after completing configuration of a connection to the eNB, UE 1, which is a SUE, determines whether a connection of an additional UE is required (S1610). If it is determined that a new connection is needed, UE 1 makes a request to the eNB for access of UE 2 (S1615). In response to the request, the eNB may determine whether to approve additional registration/allocation of UE 2 based on the pre-secured information about the SUE (S1620). Then, when the eNB determines to add UE 2 as an SUE, the eNB transmits information indicating approval of additional assignment of UE 2 to UE 1 (S1620), and UE 2 establishes a connection with the eNB, and information indicating additional allocation complete notification to the eNB (S1630).

In contrast, in FIG. 16B, the eNB may not approve the additional registration/allocation of UE 2 immediately after receiving the request of UE 1 (S1640), but may instruct UE 1 to transmit additional information (for example, a channel measurement result, etc.) about UE 2 (S1645). When UE 2 measures a channel with the eNB, UE 1 reports the measured information to the eNB (S1650). The eNB determines whether to additionally register/allocate UE 2 based on the received additional information (S1660), and subsequent processes are similar to those described in FIG. 16A.

Figure 17A:
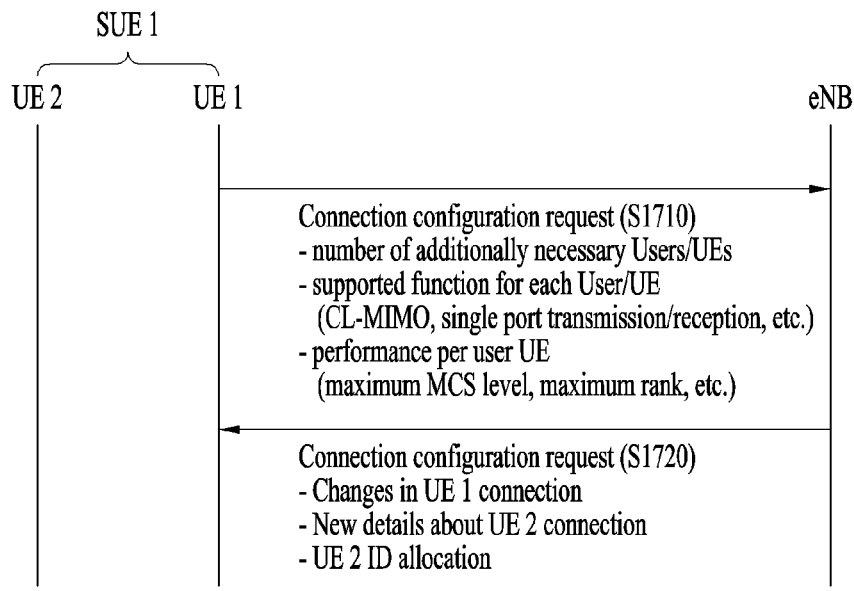
Figure 17B:
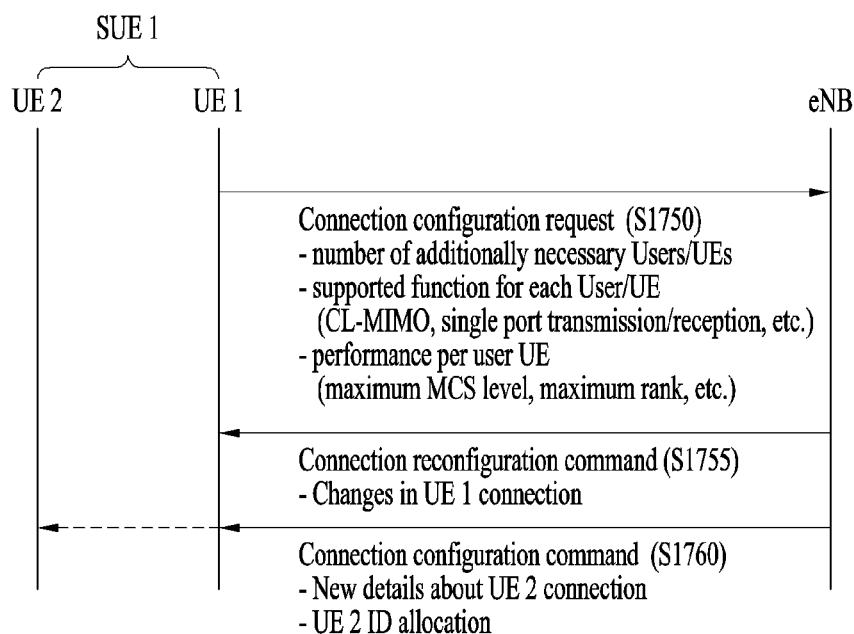

FIGS. 17A and 17B illustrate an embodiment in which a new connection is added through a process of the SUE reconfiguring the connection with the eNB. When the number of UEs registered with the eNB as the same SUE increases, the number of codewords that can be simultaneously received by each UE of the SUE and the type of preferred transmission beam are changed, and thus the physical form of connection between the UEs and the eNB is changed. In addition, as the number of UEs constituting the SUE increases, the number of receive antennas (or DUs) used by each UE to receive signals from the eNB may decrease. Thus, addition of a new UE according to the virtual UE scheme may cause reconfiguration of a preconfigured connection between the SUE and the eNB.

FIG. 17A shows an embodiment in which UE 1 delivers a connection reconfiguration request message to the eNB in the process of requesting connection of UE 2 in the aforementioned situation. By transmitting the connection reconfiguration message to the eNB, UE 1 may not only request that the eNB add UE 2 as a new UE according to the virtual UE scheme, but also inform the eNB of the change in connection due to addition of UE 2, pre-notify the eNB of the information required for the connection reconfiguration, such as a connection characteristics parameter suitable to support the SUE, or deliver information required for the eNB to specifically identify the change of the SUE (step S1710).

The information required for the connection reconfiguration may include, for example, at least one of the number of UEs requesting an additional connection, supportable functions (CL (closed loop)-MIMO, single port transmission/reception, etc.) for each UE for the additional connection, and performance (maximum supportable MCS level, maximum rank, etc.) for each UE.

Upon receiving the connection reconfiguration request message from the SUE, the eNB approves change of the SUE to include UE 2 and transmits a connection reconfiguration command message to UE 1 (S 1720). The information included in the connection reconfiguration command message may include at least one of information on changes in the connection of UE 1, information related to a new connection of UE 2, and information on the UE ID of UE 2.

FIG. 17B illustrates an embodiment in which the eNB separately transmits a connection reconfiguration command message to a UE 1 and a UE 2. Specifically, the eNB transmits information about the change of the existing connection to UE 1 (S1755), which is the pre-registered UE, and transmits a message instructing connection with the eNB to UE 2, which is a new UE (S1760).

Figure 18:
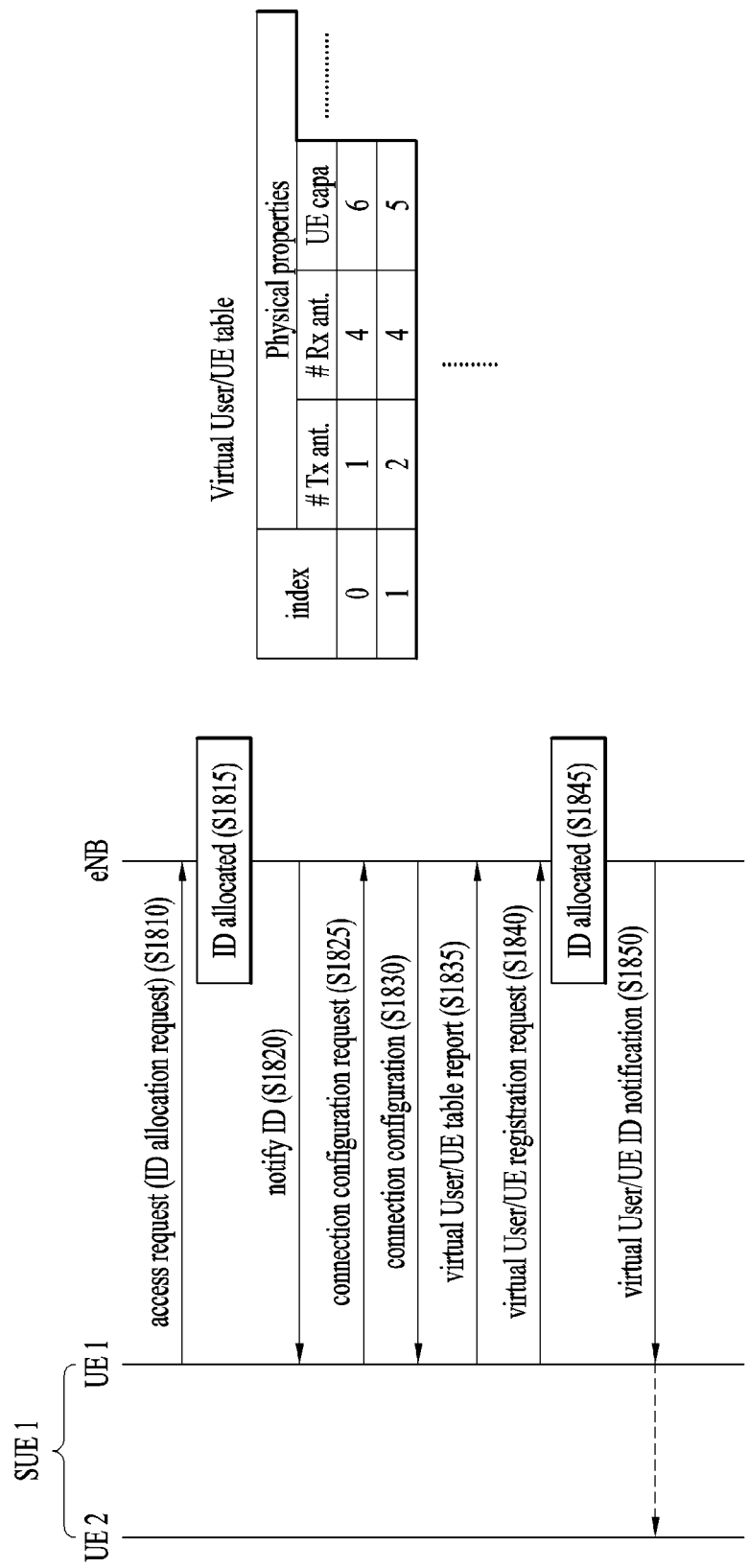

FIG. 18 illustrates another embodiment in which the SUE adds a connection of a new UE according to a virtual UE scheme.

In the embodiment of FIG. 18, the SUE pre-negotiates, with the eNB, information on UEs that can be registered, and adds a UE connection using an index indicating one or more of the UEs that can be registered.

Specifically, the amount of information representing the number of candidate UEs connectable to the eNB and the physical characteristics of each UE may be relatively large. Particularly, when registration and release of UEs frequently occur according to the virtual UE scheme, radio resources may be severely wasted due to the connection reconfiguration request described above. Accordingly, the SUE reports, to the eNB, the characteristics of the candidate UEs for which the SUE is likely to request registration later, in the form of an index table (S1835). Subsequently, when addition of a connection of a new UE is required, the SUE may transmit an index value in the table to the eNB (S1940), thereby reducing signaling overhead of the registration request of the UE.

The table shown on the right side of FIG. 18, which is an example of the above-mentioned index table, may include, as an example of the physical property values, information such as the number of transmit antennas, the number of receive antennas, whether MIMO is supported, whether single port transmission/reception is supported, the maximum MCS level, the maximum rank, and the like. If the physical property values are pre-mapped to predetermined indexes, the SUE may greatly reduce overhead for transmitting the connection reconfiguration request message of a UE described in FIGS. 17A and 17B.

Figures 19, 20:
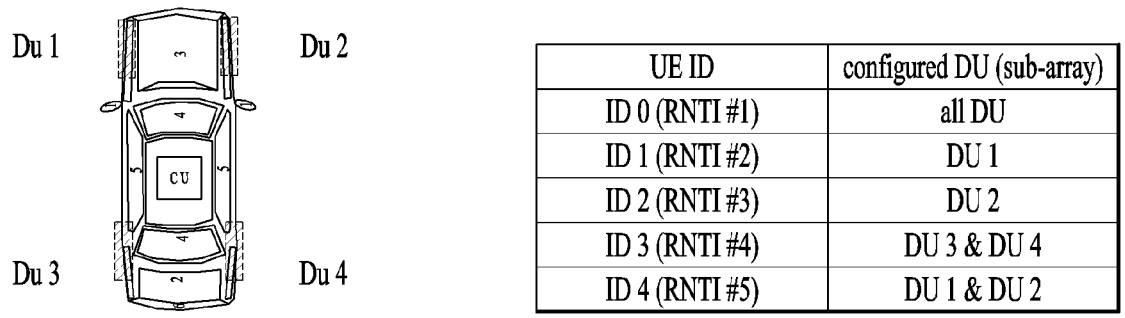
FIG. 19 illustrates various examples of configuring DUs corresponding to UE IDs in the proposed virtual UE scheme.
FIG. 20 shows a table for an embodiment of configuring indexes for combinations of DUs.

FIG. 19 illustrates various examples of configuring DUs corresponding to UE IDs in the proposed virtual UE scheme. FIG. 20 shows a table for an embodiment of configuring indexes for combinations of DUs in relation to FIG. 19.

According to an embodiment, each SUE may concurrently negotiate with the eNB a combination of UEs which can be registered with the eNB. Accordingly, the process of the SUE making a request to the eNB for connection of a new UE is performed in such a manner that the SUE selects a combination and transmits the index of the combination.

Specifically, in the example of FIG. 19, for a UE configured with four DUs, UE IDs may be mapped to DU combinations as shown in the table of FIG. 19. In this case, it is not appropriate to register DU combinations corresponding to ID 1, ID 2 and ID 4 with the eNB simultaneously. This is because DU 1, which is a DU corresponding to ID 1, and DU 2, which is a DU corresponding to ID 2, also correspond to ID 4. That is, if IDs 1, 2, and 4 are simultaneously registered with the eNB, gain according to multiuser reception is reduced or is not obtained.

Therefore, in applying the virtual UE scheme, the SUE may pre-determine combinations of DUs that are simultaneously usable and combinations of DUs that are not simultaneously usable. Furthermore, the SUE may transmit combination indexes as shown in FIG. 20 in the process of making a request to the eNB for registration of a specific DU combination. By pre-matching the combination indexes with the combinations of DUs, the SUE can reduce signaling overhead for informing the eNB of combinations of UEs that can be registered simultaneously.

For example, when it is assumed that DU 1 corresponding to ID 1 is registered as an SUE with the eNB, the SUE may transmit a combination index '2' to the eNB to request that DU 1 and DU 2 corresponding to ID 1 and ID 2 be connected as the SUE. That is, DU 1 may request that DU 2 be added to the SUE.

Figure 21:
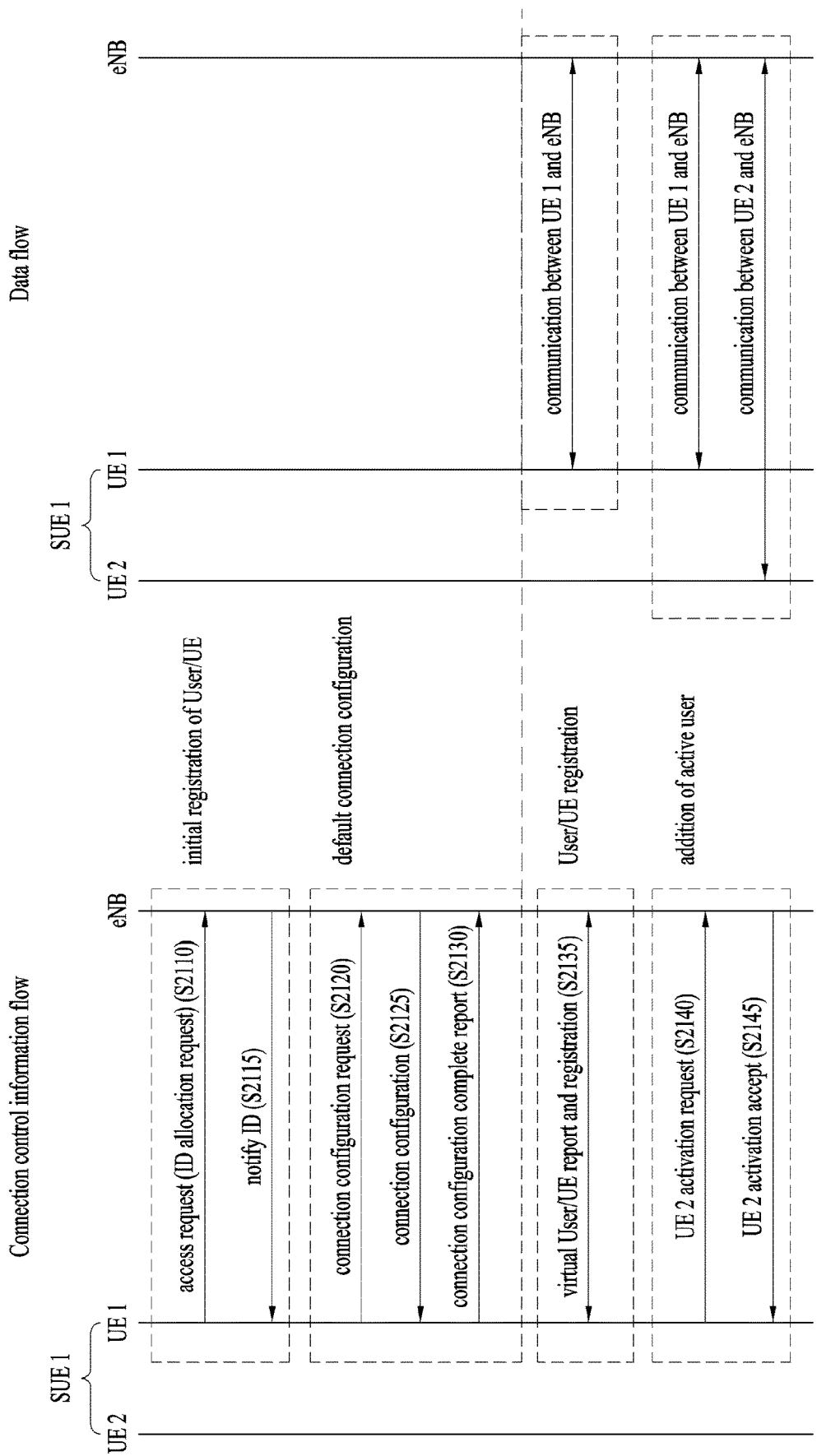
FIG. 21 is a flowchart illustrating a method for accessing a network by using the virtual UE scheme according to another embodiment.

FIG. 21 is a flowchart illustrating a method for accessing a network by using the virtual UE scheme according to another embodiment. In contrast with the descriptions given above, in the embodiment of FIG. 21, UEs are pre-registered with the eNB and are then activated/deactivated.

In the case of vehicular communication in which the channel situation changes rapidly and the configuration of DUs capable of receiving a signal from the eNB and the configuration of DUs capable of receiving a signal from the eNB, it is necessary to rapidly change the configuration of the UEs used for communication in real time. The multi-stage signaling process between the UE and the eNB including higher layer signaling may not be suitable to support this vehicular communication environment. Accordingly, the SUE may pre-register multiple UEs with the eNB, and perform dynamic UE selection/switching of quickly changing configuration of UEs to be used for communication in consideration of a channel or environment change.

For this implementation, the SUE registers the multiple UEs with the eNB with the multiple UEs set in an inactive state. A UE registered in the inactive state does not participate in communication, and then switches to the active state according to change in channel or environment to communicate with the eNB. For example, in FIG. 21, UE 1 establishes an initial connection with the eNB through steps S2110 to S2130, and subsequently registers multiple UEs including UE 2 in the inactive state with the eNB in S2135. If it is necessary for UE 2 to perform communication with the eNB according to change in the communication environment and channel, UE 1 makes a request to the eNB for activation of UE 2 (S2140). When activation of UE 2 is approved by the eNB, UE 2 switches to the active state for communication with the eNB (S2145).

Meanwhile, in the embodiment of FIG. 21, the process of pre-registering multiple UEs with the eNB may be implemented by setting indexes for the respective UEs and transmitting an index value. Signaling overhead may be reduced by transmitting and receiving the index value. This embodiment may be understood as being similar to FIG. 18. According to another embodiment, the SUE may pre-match and register combinations of UEs that are available at the same time with an index table in the process of pre-registering multiple UEs with the eNB, and then transmit an index value to request activation of a combination of specific UEs. This embodiment may be understood as being similar to the embodiment of FIGS. 19 and 20.

6. Device Configuration

Figure 22:
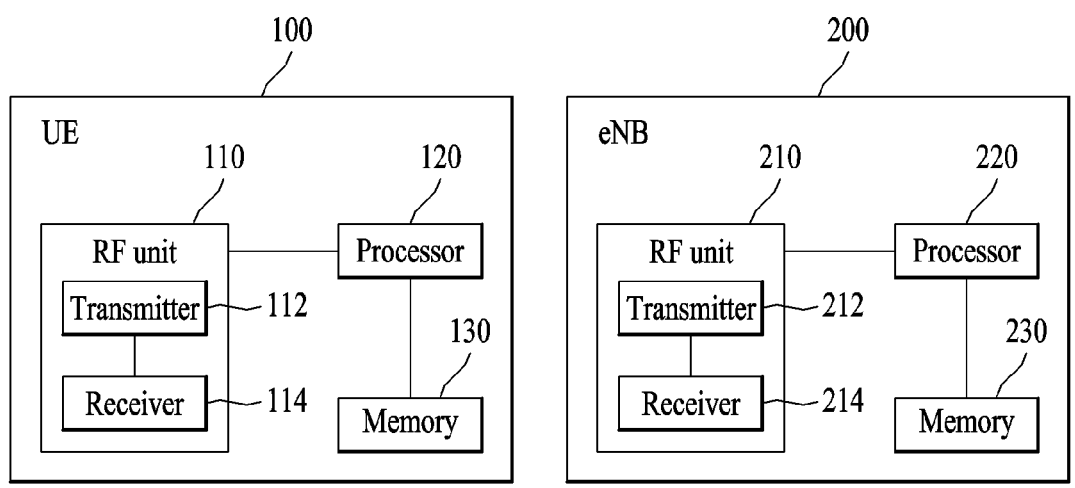
FIG. 22 shows configuration of a UE and an eNB related to a proposed embodiment.

FIG. 22 is a block diagram for a user equipment and an eNB in accordance with the present invention. In FIG. 22, a user equipment 100 and an eNB 200 can include a radio frequency (RF) unit 110/210, a processor 120/220 and a memory 130/230, respectively. Although FIG. 22 shows one-to-one communication environment between the user equipment 100 and the eNB 200, communication environment can be constructed between a plurality of user equipment and the eNB 200. And, the eNB 200 depicted in FIG. 22 can be applied to both a macro cell eNB and a small cell eNB.

Each of the RF units 110/210 can include a transmitter 112/212 and a receiver 114/214, respectively. The transmitter 112 and the receiver 114 of the user equipment 100 are configured to transmit and receive a signal with the eNB 200 and different user equipments. The processor 120 is functionally connected with the transmitter 112 and the receiver 114 and is configured to control the transmitter 112 and the receiver 114 to transmit and receive signal with different devices. And, the processor 120 performs various processing on a signal to be transmitted and transmits the signal to the transmitter 112. The processor performs processing on a signal received by the receiver 114.

If necessary, the processor 120 can store information included in an exchanged message in the memory 130. The user equipment 100 can perform the aforementioned various embodiments of the present invention with the above-mentioned structure.

The transmitter 212 and the receiver 214 of the eNB 200 are configured to transmit and receive a signal with a different eNB and user equipments. The processor 220 is functionally connected with the transmitter 212 and the receiver 214 and is configured to control the transmitter 212 and the receiver 214 to transmit and receive signal with different devices. And, the processor 220 performs various processing on a signal to be transmitted and transmits the signal to the transmitter 212. The processor performs processing on a signal received by the receiver 214. If necessary, the processor 220 can store information included in an exchanged message in the memory 230. The eNB 200 can perform the aforementioned various embodiments of the present invention with the above-mentioned structure.

Each of the processors 120/220 of the user equipment 100 and the eNB 200 indicates (e.g., control, adjust, manage) operations in the user equipment 100 and the eNB 200. Each of the processors 120/220 can be connected with the memory 130/230 storing program codes and data. The memory 130/230 is connected with the processor 120/220 and stores an operating system, an application, and general files.

The processor 120/220 of the present invention can be named by such a terminology as a controller, a microcontroller, a microprocessor, a microcomputer and the like. Meanwhile, the processor can be implemented by hardware, firmware, software and a combination thereof.

In the implementation by hardware, ASICs (application specific integrated circuits), DSPs (digital signal processors), DSPDs (digital signal processing devices), PLDs (programmable logic devices), FPGAs (field programmable gate arrays) and the like configured to perform the present invention can be installed in the processor 120/220.

Meanwhile, the aforementioned method can be written by a program executable in a computer and can be implemented by a general digital computer capable of operating the program using a computer readable medium. And, data structure used for the aforementioned method can be recorded in the computer readable medium in various means. Program storing devices usable for explaining a storing device including an executable computer code to perform various methods of the present invention should not be comprehended as temporary objects such as carrier waves and signals. The computer readable medium includes such a storing medium as a magnetic storing medium (e.g., a ROM, a floppy disk, a hard disk and the like) and an optical reading medium (e.g., a CD-ROM, a DVD and the like).

While the present invention has been described and illustrated herein with reference to the preferred embodiments thereof, it will be apparent to those skilled in the art that various modifications and variations can be made therein without departing from the spirit and scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

INDUSTRIAL APPLICABILITY

The network connection method as described above can be applied not only to 3GPP LTE and LTE-A systems, but also to various wireless communication systems including IEEE 802.16x and 802.11x systems. Furthermore, the proposed method can be applied to a mmWave communication system using a very high frequency band.

The invention claimed is:

1. A method for accessing, by a terminal, a network using a virtual user equipment (UE) scheme, the method comprising:
establishing a connection with a base station for a first distributed unit (DU) group including one or more DUs;
requesting, through an uplink channel allocated to the first DU group from the base station, that the base station establish a connection for a second DU group including one or more DUs; and
transmitting, to the base station over an uplink channel allocated to the second DU group, information indicating that the connection for the second DU group has been established when the base station approves the connection for the second DU group,
wherein requesting that the base station establish a connection for a second DU group comprises requesting that a connection preconfigured between the first DU group and the base station be reconfigured, and
wherein requesting that a connection preconfigured between the first DU group and the base station be reconfigured comprises:
transmitting information on at least one of whether or not Closed Loop Multi Input Multi Output (CL-MIMO) of the second DU group is supported, whether or not single port transmission or reception is performed, a maximum modulation and coding scheme (MCS) level, or a maximum rank number, and
transmitting an index value matching the information to the base station.

2. The method according to claim 1, further comprising:
receiving a request for additional information on the second DU group from the base station in response to a request for the connection for the second DU group; and
transmitting information about a channel measured between the second DU group and the base station to the base station.

3. The method according to claim 1, wherein the requesting comprises:
transmitting, to the base station, a preset index value for the one or more DUs included in the second DU group.

4. The method according to claim 1, wherein the first DU group and the second DU group are separately recognized by the base station and are recognized as one object by an upper network entry.

5. The method according to claim 1, wherein one bearer is shared between the first DU group and the second DU group.

6. The method according to claim 1, wherein the one or more DUs included in the first DU group are distributed over a vehicle and connected to a central unit (CU).

7. A terminal for accessing a network using a virtual UE scheme, the terminal comprising:
a transmitter;
a receiver; and
a processor connected to the transmitter and the receiver, wherein the processor is configured to:
establish a connection with a base station for a first distributed unit (DU) group including one or more DUs;
request, through an uplink channel allocated to the first DU group from the base station, that the base station establish a connection for a second DU group including one or more DUs; and
transmit, to the base station over an uplink channel allocated to the second DU group, information indicating that the connection for the second DU group has been established when the base station approves the connection for the second DU group, wherein when the processor requests that the base station establish a connection for a second DU group, the processor is further configured to request that a connection preconfigured between the first DU group and the base station be reconfigured, and wherein when the processor requests that a connection preconfigured between the first DU group and the base station be reconfigured, the processor is further configured to:

transmit information on at least one of whether or not Closed Loop Multi Input Multi Output (CL-MIMO) of the second DU group is supported, whether or not single port transmission or reception is performed, a maximum modulation and coding scheme (MCS) level, or a maximum rank number, and transmit an index value matching the information to the base station.

\* \* \* \* \*